(12) United States Patent
Yamamoto et al.

(10) Patent No.: US 8,578,586 B2
(45) Date of Patent: Nov. 12, 2013

(54) POWER GENERATION ASSEMBLIES, AND APPARATUS FOR USE THEREWITH

(76) Inventors: Shigeyuki Yamamoto, Medford, MA (US); Warren E. Colburn, Mystic, CT (US)

(*) Notice: Subject to any disclaimer, the term of this patent is extended or adjusted under 35 U.S.C. 154(b) by 1466 days.

(21) Appl. No.: 11/938,318

(22) Filed: Nov. 12, 2007

(65) Prior Publication Data

US 2010/0278630 A1 Nov. 4, 2010

Related U.S. Application Data

(63) Continuation-in-part of application No. 10/904,040, filed on Oct. 20, 2004, now Pat. No. 7,293,960.

(60) Provisional application No. 60/481,547, filed on Oct. 23, 2003.

(51) Int. Cl.
*B23P 11/00* (2006.01)
*F01D 1/24* (2006.01)

(52) U.S. Cl.
USPC .......................... 29/525.01; 415/60

(58) Field of Classification Search
USPC ......... 29/525.01; 290/42–55; 415/60; 60/501
See application file for complete search history.

(56) References Cited

U.S. PATENT DOCUMENTS

| | | | |
|---|---|---|---|
| 1,184,362 A * | 5/1916 | Lindquist | 60/501 |
| 4,079,264 A * | 3/1978 | Cohen | 290/55 |
| 4,088,419 A | 5/1978 | Hope | |
| 4,140,433 A | 2/1979 | Eckel | |
| 4,321,476 A | 3/1982 | Buels | |
| 4,383,182 A * | 5/1983 | Bowley | 290/43 |
| 4,486,143 A | 12/1984 | McVey | |
| 4,524,285 A * | 6/1985 | Rauch | 290/43 |
| 4,631,921 A * | 12/1986 | Linderfelt | 60/501 |
| 4,843,249 A * | 6/1989 | Bussiere | 290/53 |
| 4,868,408 A * | 9/1989 | Hesh | 290/52 |
| 5,429,480 A | 7/1995 | Van Der Kaken | |
| 5,457,346 A | 10/1995 | Blumberg | |
| 5,464,320 A | 11/1995 | Finney | |
| 5,520,505 A * | 5/1996 | Weisbrich | 415/4.1 |
| 5,709,419 A | 1/1998 | Roskey | |

(Continued)

FOREIGN PATENT DOCUMENTS

| | | |
|---|---|---|
| WO | WO 03/072428 A1 | 9/2003 |
| WO | WO 2005040604 A2 * | 5/2005 |

OTHER PUBLICATIONS

U.S. Department of Energy et al., Workshop on Deep Water Offshore Wind Energy Systems (2003), available at www.nrel.gov/wind_meetings/offshore_wind.*

(Continued)

*Primary Examiner* — David Bryant
*Assistant Examiner* — Jacob Cigna
(74) *Attorney, Agent, or Firm* — David J. Cole

(57) ABSTRACT

A floating power generation assembly comprises at least three floating units (900) floating on a body of water, and at least three anchors (916) secured to a solid surface beneath the body of water, each of the floating units (900) being provided with a power generator, the floating units (900) being arranged substantially at the vertices of at least one equilateral triangle. Ship-borne apparatus for deploying the floating units of such a power generation assembly and a novel multiple wind turbine assembly are also described.

7 Claims, 41 Drawing Sheets

(56) References Cited

U.S. PATENT DOCUMENTS

| | | | |
|---|---|---|---|
| 5,850,108 A * | 12/1998 | Bernard | 290/54 |
| 6,139,255 A * | 10/2000 | Vauthier | 415/7 |
| 6,756,695 B2 * | 6/2004 | Hibbs et al. | 290/42 |
| 6,836,738 B2 | 12/2004 | Sepp | |
| 7,075,189 B2 * | 7/2006 | Heronemus et al. | 290/44 |
| 7,337,726 B2 * | 3/2008 | Wobben | 104/112 |
| 2004/0056486 A1 * | 3/2004 | Wobben | 290/44 |
| 2005/0206168 A1 * | 9/2005 | Murakami et al. | 290/55 |
| 2006/0171798 A1 * | 8/2006 | Yamamoto et al. | 415/4.5 |

OTHER PUBLICATIONS

Bulder et al., Floating Offshore Wind Turbines for Shallow Waters (Abstract only), available at www.ecn.nl/library'reports/2003/rx03039.html.*

Eneco, Inc., WARP: Wind Amplified Rotor Platforms, available at www.warp-eneco.com.*

* cited by examiner

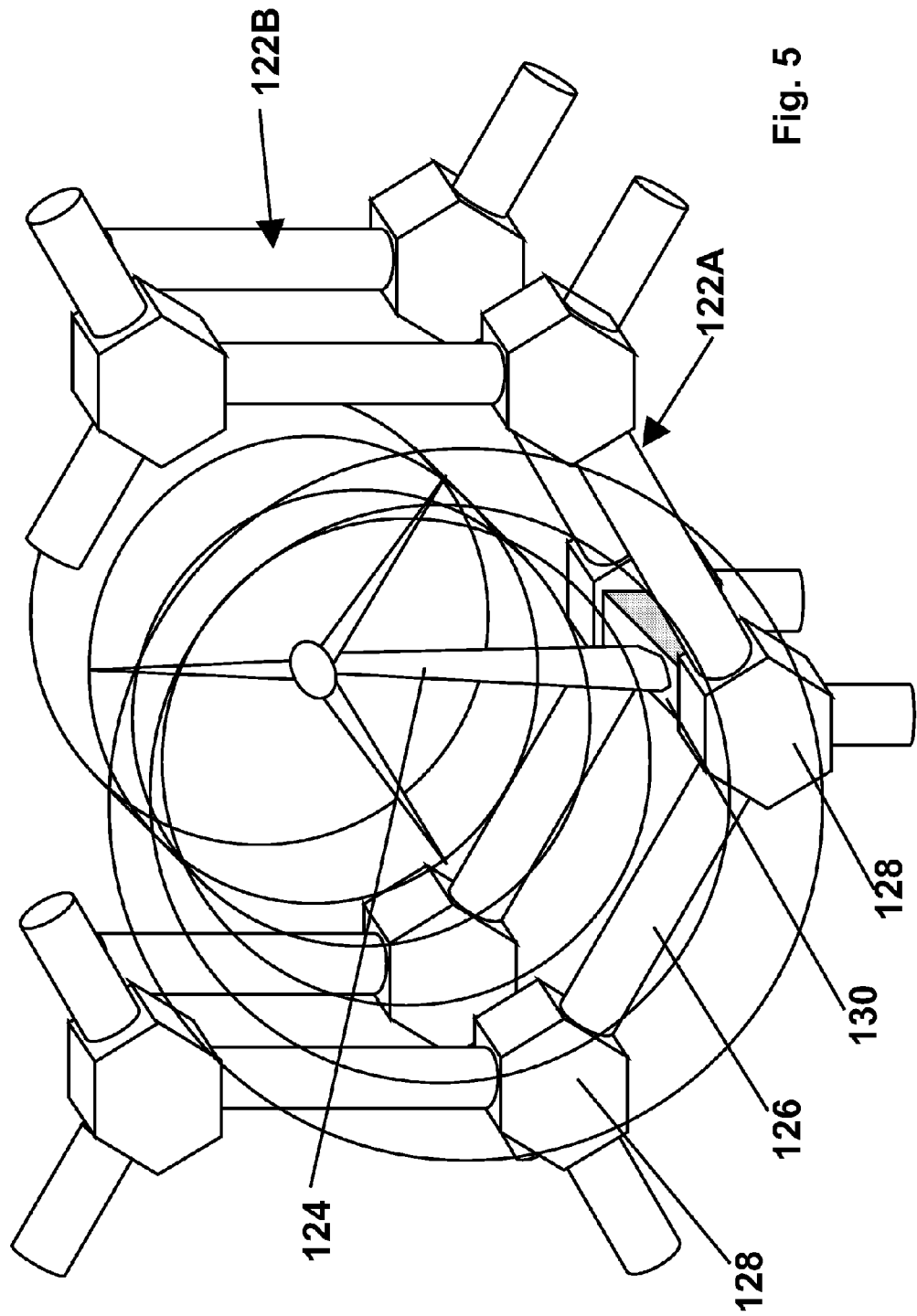

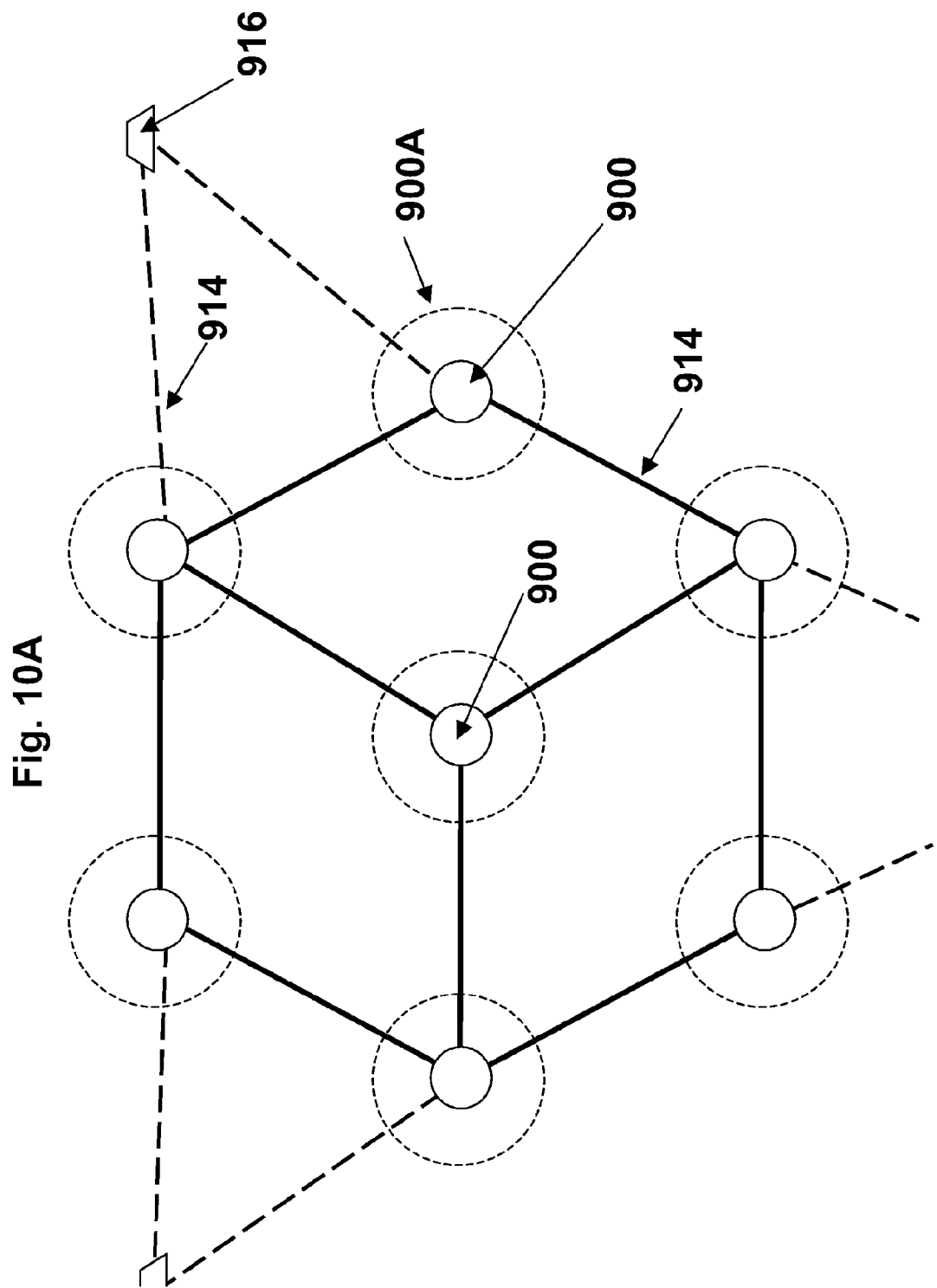

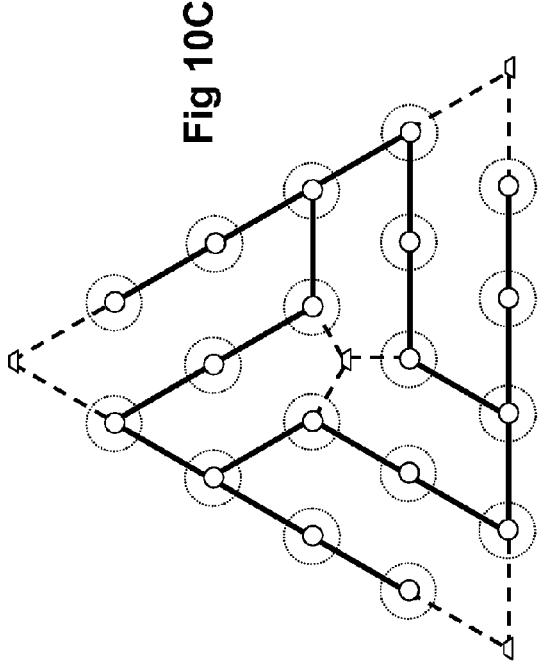
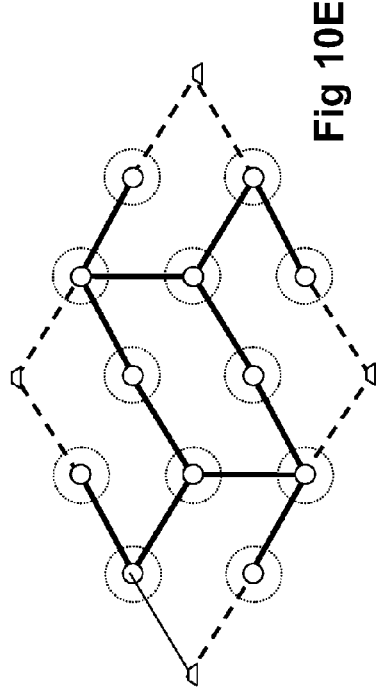
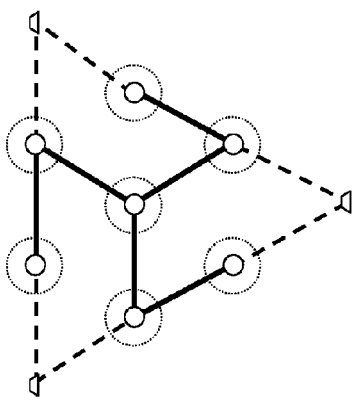
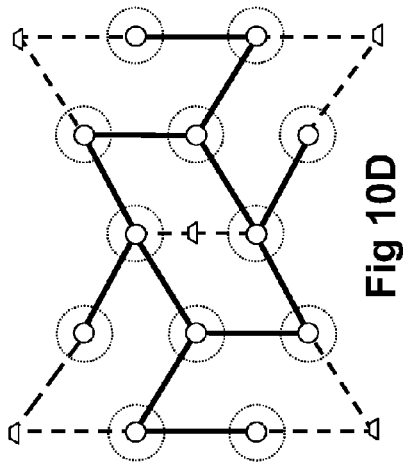

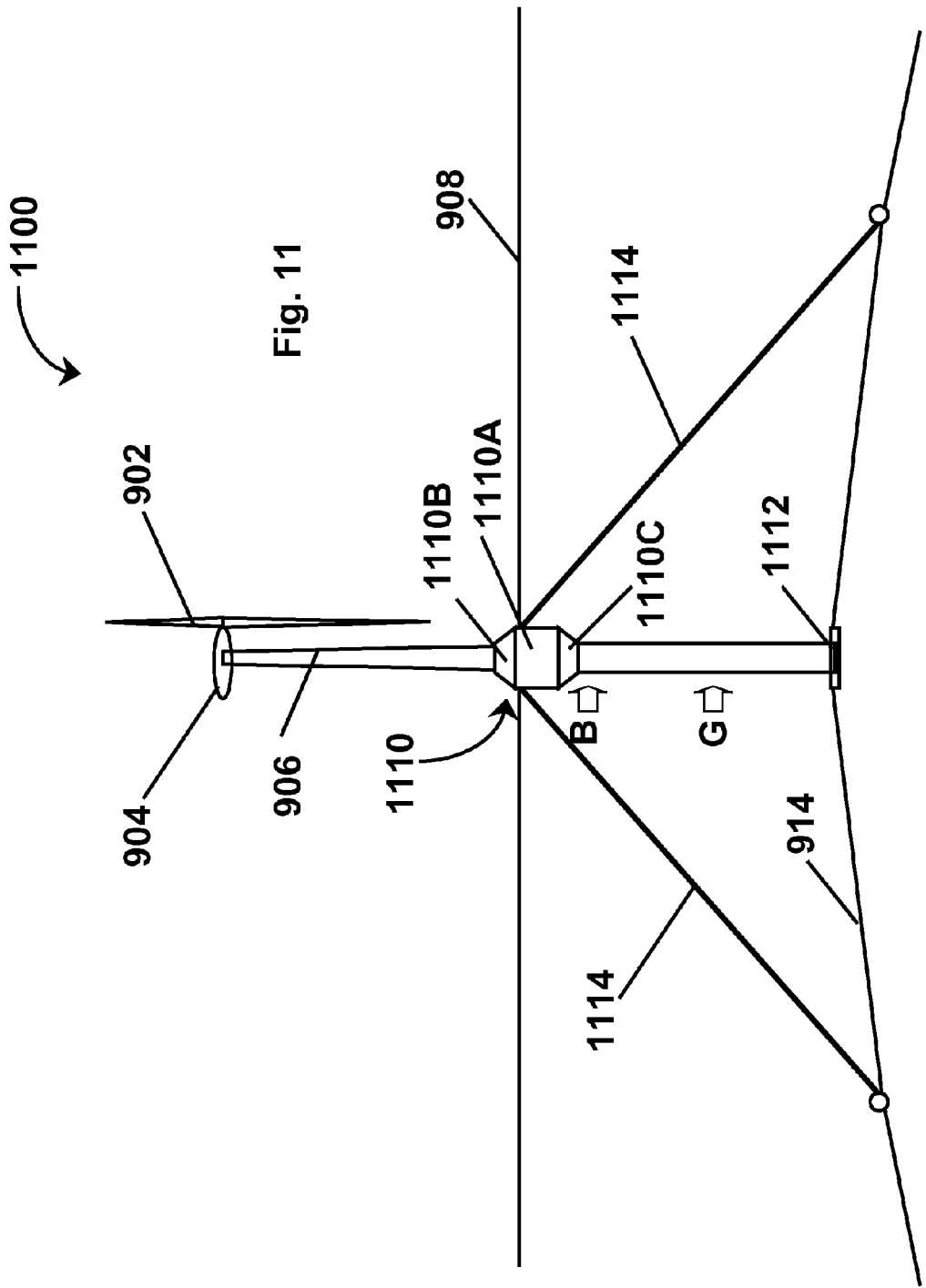

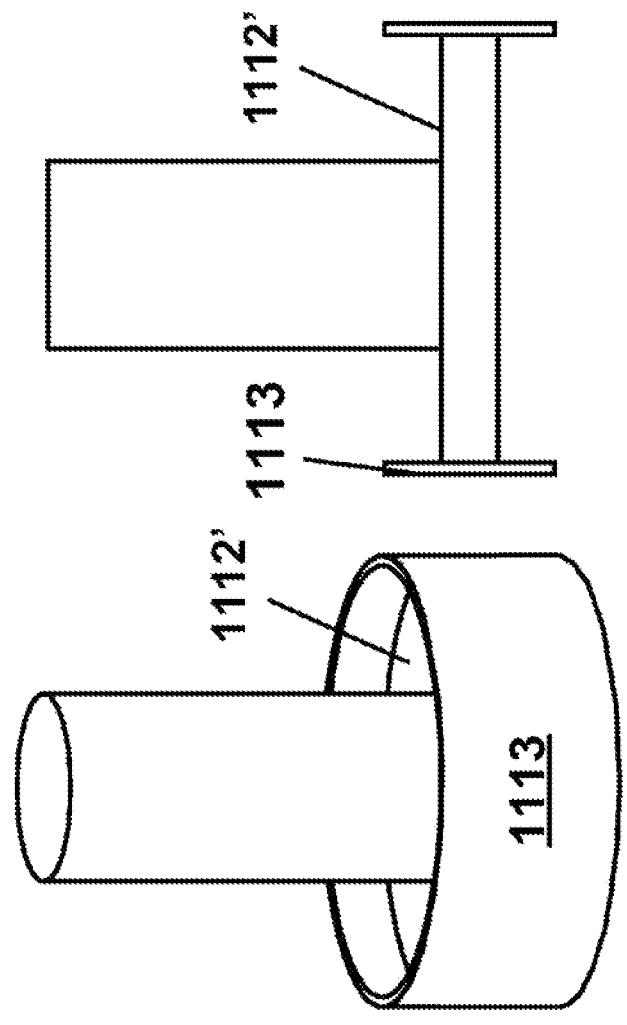
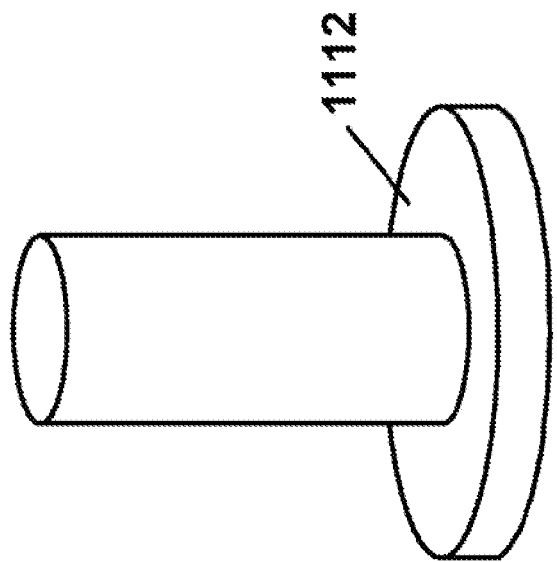

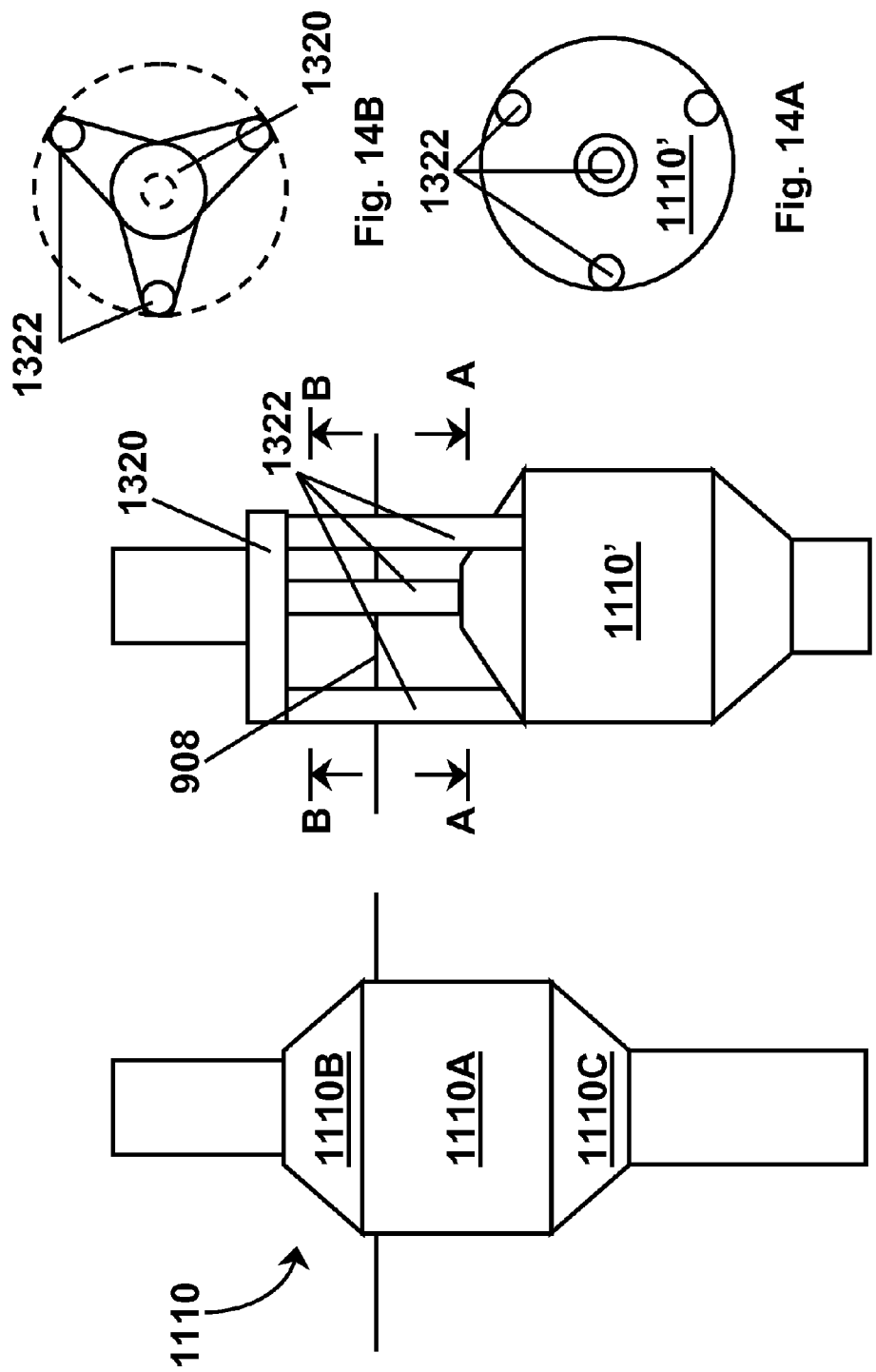

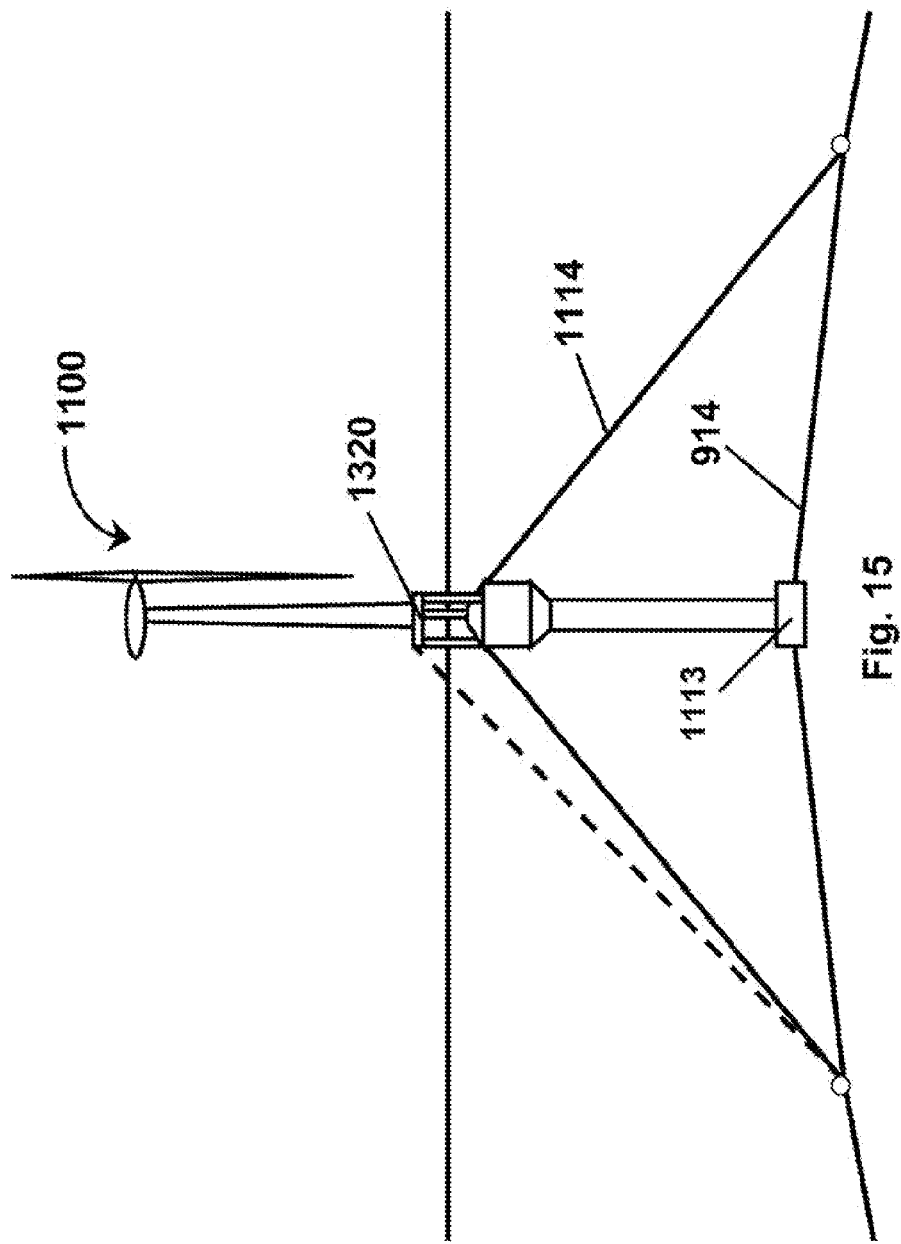

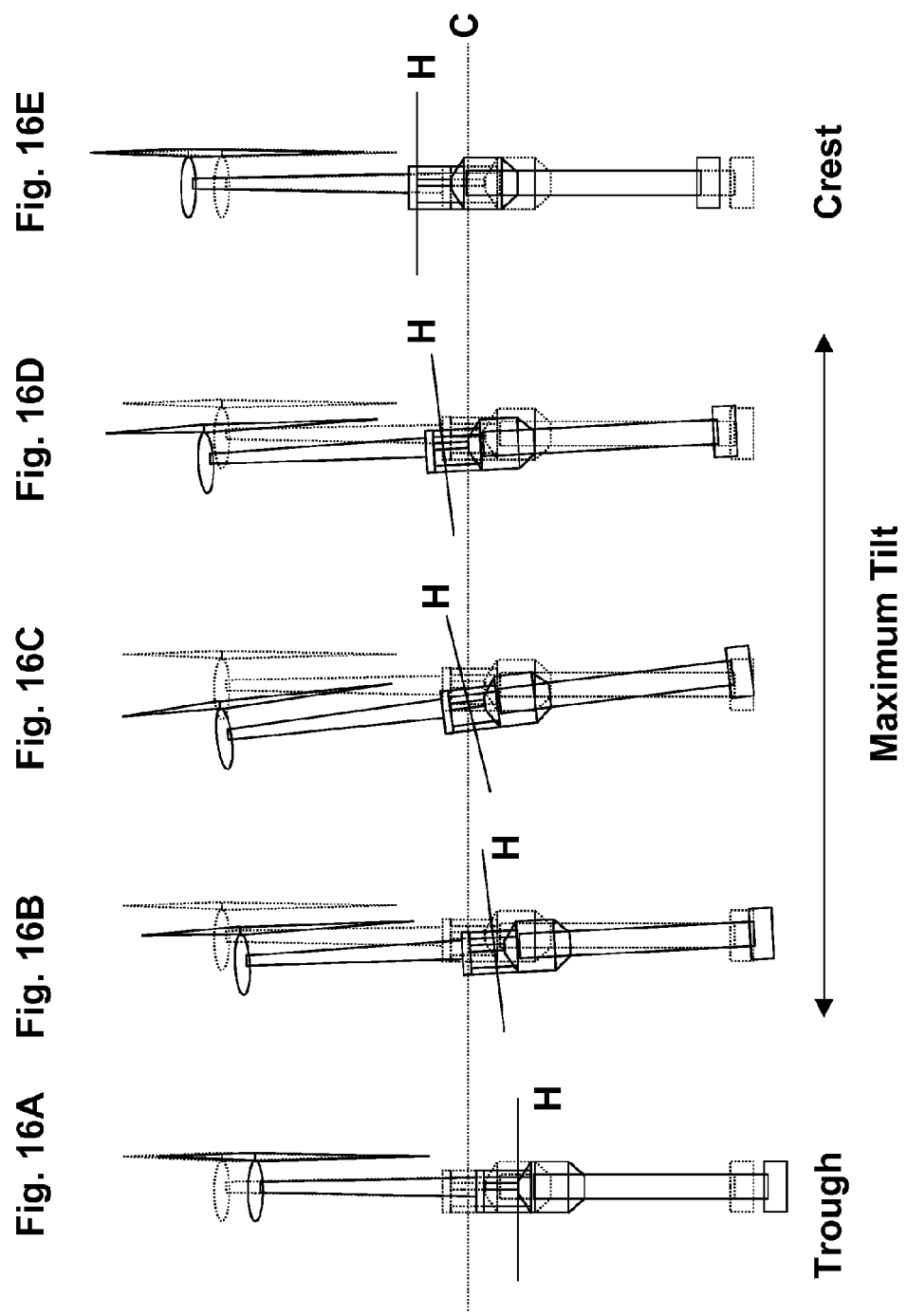

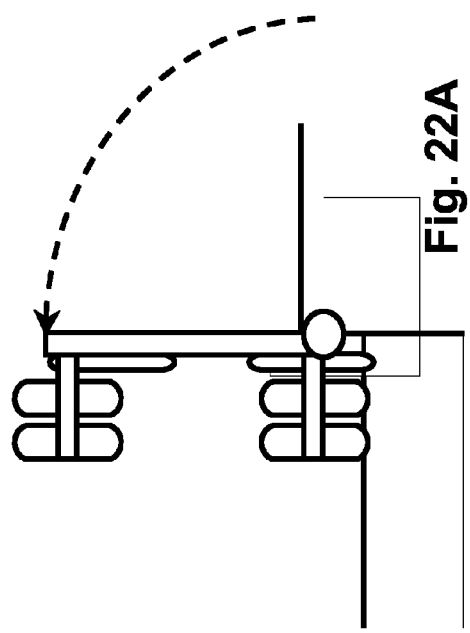
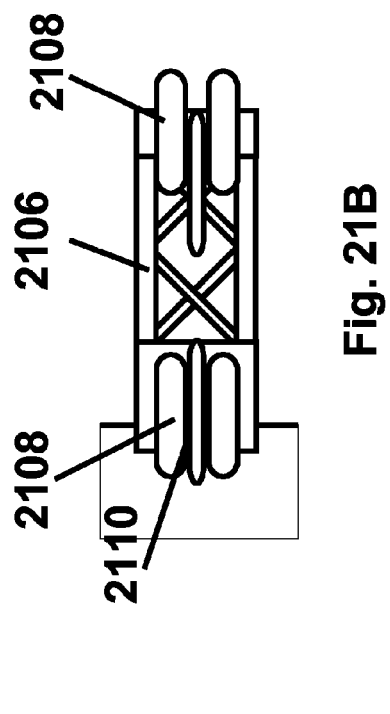
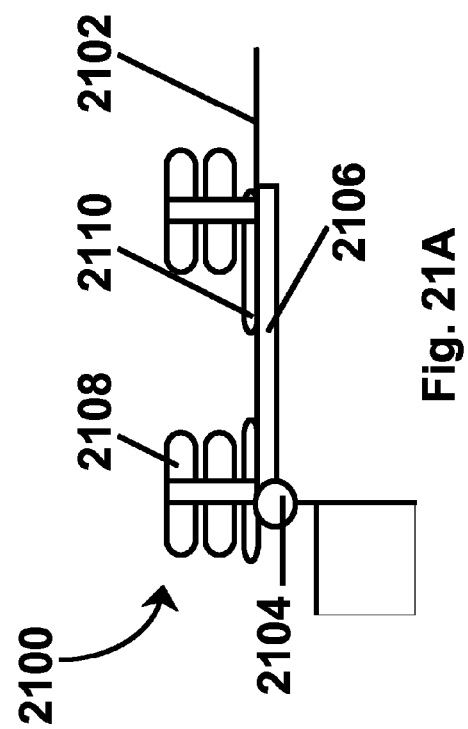

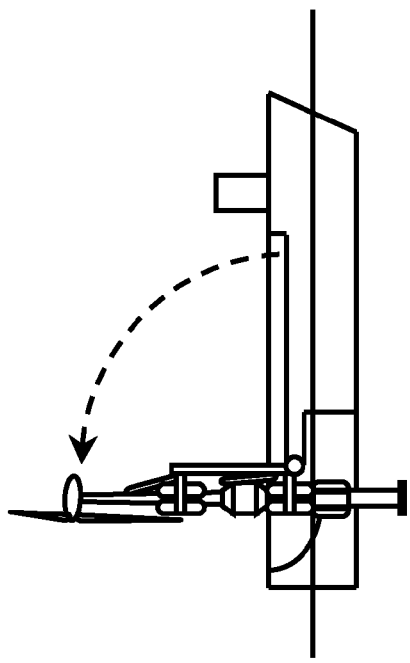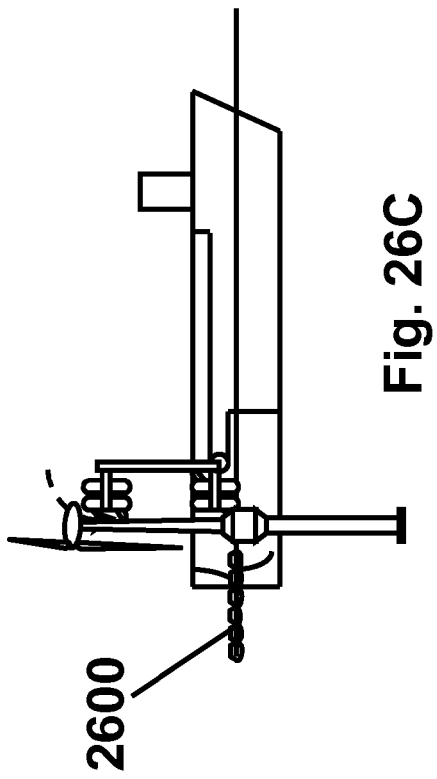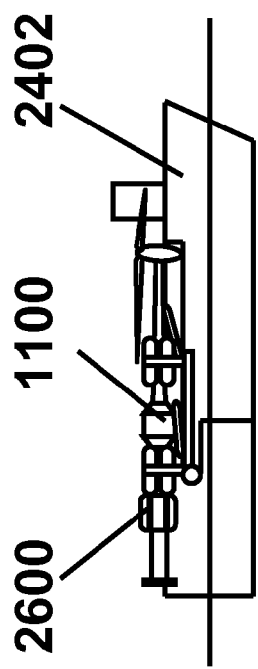

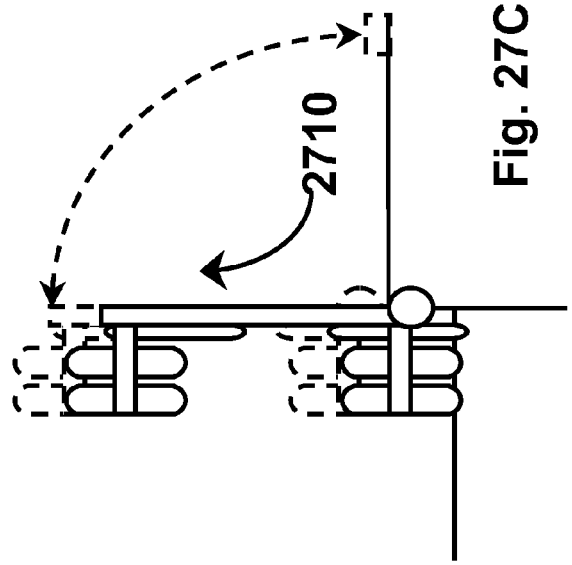
Fig. 27D
Fig. 27C
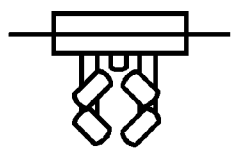
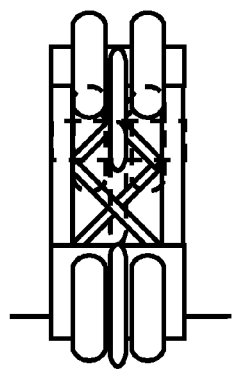
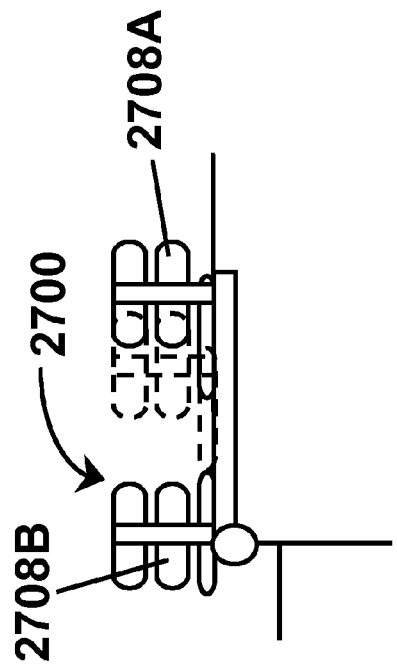
Fig. 27B
Fig. 27A

POWER GENERATION ASSEMBLIES, AND APPARATUS FOR USE THEREWITH

REFERENCE TO RELATED APPLICATIONS

This application is a continuation-in-part of copending application Ser. No. 10/904,040, filed Oct. 20, 2004 (Publication No. 2006/0171798), which itself claims benefit of provisional Application Ser. No. 60/481,547, filed Oct. 23, 2003. The entire contents of both these copending application are herein incorporated by reference.

BACKGROUND OF INVENTION

This invention relates to power generation assemblies, and apparatus for use therewith. More specifically, this invention relates to (a) a floating power generation assembly; (b) a process for placing a floating unit on water, this process being especially, although not exclusively, intended for use in deploying certain components of the floating power generation assembly of the invention; and (c) a multiple wind turbine assembly.

As concern over the environmental consequences of conventional power plants, including their carbon dioxide emissions, has increased in recent years, greater attention has been focused upon so-called "green" or environmentally advantageous power plants which use renewable sources of energy and do not cause substantial emissions of carbon dioxide or other pollutants. Potential green power plants include photovoltaic plants, which generate energy from sunlight, and plants which derive energy from tides, ocean currents and wave action.

One type of green power plant which has already been shown to be commercially viable is the wind turbine or windmill. So-called "wind farms" having multiple wind turbines have been constructed in several parts of the world and have made significant contributions to electricity production. In 2002, total wind farm capacity in the European Union was about 23,000 MW, and in the United States about 5,000 MW.

Unfortunately, although wind farms are environmentally advantageous in the sense of not emitting pollutants, they can create opposition due to their visual impact. To be economically viable, wind farms need to be situated where high average wind velocities are expected. On land, such sites are often on mountain ridges or on flat plains, and in either location conventional wind farms, using individual rotors 30 meters or more in diameter mounted on masts about 30 meters high, are conspicuous for miles. Furthermore, such mountain ridges or plains are often in areas celebrated for their natural beauty and such wind farm projects can face stiff opposition, resulting in higher project costs.

Accordingly, interest has recently shifted to off-shore wind farms. The first such off-shore wind farms have been established in shallow water (typically 15 meters or less deep) close to shore, and the equipment used has been essentially the same as in land-based wind farms, with the masts supporting the rotors mounted on the seabed and lengthened as necessary to keep the rotors at the desired height above the water. However, such shallow water wind farms have attracted the same types of controversy as land-based wind farms. For example, a recent proposal to place a large wind farm of more than 100 units in Nantucket Sound off the coast of Massachusetts has led to objections that the wind farm will have too much visual impact on ocean views. It has also been alleged that the rotors may kill or injure substantial numbers of birds.

Public controversy relating to wind farms would be reduced by moving off-shore wind farms a greater distance off-shore, although the maximum distance off-shore where wind farms can be located is limited by the expense of the undersea high voltage cables required to bring the electricity generated on-shore; such cables can incur very significant costs. Moreover, the choice of suitable off-shore locations for wind farms, even relatively close to shore, is limited by water depth. If wind farms are required to operate in deeper waters, say 100-200 meters, as the water depth increases, it becomes increasingly impracticable, from both engineering and economic view points, to continue with seabed mounted masts bearing single large rotors. Clearly at some point, it becomes necessary to base the wind farm upon one or more floating or tension leg platforms. However, to justify the high costs of deeper water wind farms, such farms will typically be required to have high power outputs, and the conventional type of single mast/single rotor wind turbine with very large rotors may not be well adapted for mounting upon a floating or tension leg platform. In one aspect, this invention seeks to provide a novel type of wind turbine assembly. The wind turbine assembly of the present invention may be useful in off-shore wind farms or other contexts, for example some land-based wind farms.

The present invention also relates to improvements in off-shore power generation assemblies, especially wind farms, to enable such assemblies to be sited in deep water without mounting a rigid structure on the sea bed or other underwater solid surface. Finally, this invention relates to a process for placing floating units on water, this process being especially intended for use in the deployment of the off-shore power generation assemblies of the present invention.

SUMMARY OF THE INVENTION

In one aspect, this invention provides a floating power generation assembly having as components at least three floating units floating on a body of water, and at least three anchors secured to a solid surface beneath the body of water, each of the floating units being provided with power generation means, each of the anchors being connected by cables to at least two of the floating units, and each of the floating units being connected by cables to at least two other components, the floating units being arranged substantially at the vertices of at least one triangle.

This aspect of the present invention may hereinafter be referred to as the "anchored floating assembly" of the invention. In such an anchored floating assembly, each power generation means may comprises at least one of a wind turbine and a means for extracting power from waves or marine currents. The three anchors may be arranged substantially at the vertices of a triangle with the floating units arranged within, or along the sides of, this equilateral triangle. In one form of the anchored floating assembly, intended for use where rough weather and/or strong currents may cause problems, each of the floating units is connected by cables to at least three other components of the assembly. The anchored floating assembly may comprise at least six floating units arranged substantially at the vertices of a hexagon, typically with a seventh floating unit disposed at the center of the hexagon.

In a preferred form of the anchored floating assembly, at least one of the floating units comprises:

a mast extending from above to below the water surface;
a wind turbine comprising a plurality of blades and rotatably mounted at or adjacent the upper end of the mast such that the blades do not contact the water as they rotate;
a buoyancy section provided on the mast adjacent the water surface and arranged to provide buoyancy to the assembly; and
a base section provided on the mast below the water surface and having the cables attached thereto, the base section being weighted such that the center of gravity of the floating unit is substantially below the water surface.

Desirably, in such an anchored floating assembly, the center of gravity of the floating unit is at least about 30 meters below the water surface, and the floating unit desirably has a metacentric height (the distance between its centers of gravity and buoyancy) of at least about 10 meters. Also, the anchored floating assembly may further comprise at least two auxiliary cables extending from the buoyancy section to the cables connecting the base section to other components of the assembly, or to other components of the assembly (including other floating units). The base section of the mast may be provided with a peripheral hoop arranged to increase the hydrodynamic mass of the floating unit and to lengthen the natural heave period thereof. The mast may have a portion of reduced cross-section at the water surface, and the portion of the mast lying below the water surface may be provided with at least one ballast tank.

This invention also provides a modified form of the floating power generation assembly defined above, this modified form being adapted (as described in detail below) to cope with a location having a wind which is predominantly in one direction. The modified assembly has as components at least three floating units floating on a body of water, and at least three anchors secured to a solid surface beneath the body of water, each of the floating units being provided with power generation means, each of the anchors being connected by cables to at least two of the floating units, and each of the floating units being connected by cables to at least two other components (including other floating units), the floating units being arranged substantially at the vertices of at least one triangle formed by elongating an equilateral triangle along one axis while leaving the triangle unchanged along the other axis.

In another aspect, this invention provides a process for placing a floating unit in water, the floating unit comprising a mast which, when floating, extends from above to below the water surface, the process comprising:
providing a vessel having a deck and a pivotable unit rotatably mounted on the deck for rotation about a horizontal axis adjacent an edge of the deck, the pivotable unit comprising a base member and two clamping members mounted on the base member and spaced apart from the each other;
clamping the mast with the clamping members, thereby holding the mast in a substantially horizontal position above the deck;
transporting the vessel and mast to a location where the floating unit is to be deployed;
pivoting the pivotable unit and mast until the mast is in a substantially vertical position; and
releasing the mast from the clamping members, thereby allowing the floating unit to float.

In this "deployment process" of the present invention, the mast may comprise at least one ballast tank and the process may further comprise at least partially filling the ballast tank with water after pivoting the mast to a substantially vertical position but before releasing the mast from the clamping members. The deployment process may further comprise placing an external floatation device on the mast while the mast is in its substantially horizontal position above the deck, and releasing the external floatation device from the mast after the floating unit is floating. Also, at least one of the clamping members may be movable relative to the base member, thereby allowing the spacing between the clamping members to be varied. Finally, the vessel may be provided with means for varying the position of the axis of rotation of the pivotable unit relative to the deck.

This invention also provides a wind turbine assembly comprising a plurality of cells, each cell having substantially the form of a hexagonal prism with a horizontal axis, each cell having a turbine mounted for rotation about an axis substantially coincident with the axis of the cell, the cells being disposed adjacent each other with their axes substantially parallel, each cell having a wall defining a passage through the cell, the turbine of the cell being located with this passage, the cross-section of the passage varying from a substantially hexagonal inlet to a substantially circular portion of minimum cross-sectional area adjacent the turbine, such that wind entering the inlet is accelerated before passing the turbine.

In such a "cellular wind turbine assembly", the diameter of the substantially circular portion of minimum cross-sectional area adjacent the turbine is desirably not greater than about 95 percent, preferably not greater than 80 percent, of the diameter of the circumcircle of the substantially hexagonal inlet. The cellular wind turbine assembly may further comprise a base member on which the cells are rotatably mounted and control means for maintaining the cells pointed into the wind being experienced. The cellular wind turbine assembly may also comprise an outer casing enclosing all the cells.

Finally, this invention provides a process for assembling a floating power generation assembly having as components at least three floating units floating on a body of water, and at least three anchors secured to a solid surface beneath the body of water, each of the floating units being provided with power generation means, each of the anchors being connected by cables to at least one of the floating units, and each of the floating units being connected by cables to at least two other components, the process comprising:
placing the anchors in the desired positions, with each anchor having attached thereto a cable, means for varying the length of the cable, at least one temporary connector capable of interconnecting at least two cables, and floatation means capable of keeping the end of the cable remote from the anchor at the water surface;
interconnecting the cables by means of the temporary connectors to provide the connections between cables required in the final assembly;
replacing the temporary connectors with the floating units; and
reducing the length of at least one cable to produce the final assembly.

BRIEF DESCRIPTION OF DRAWINGS

FIG. 5 is an enlarged schematic three quarter view, from in front and to one side, of one cell of the cellular wind turbine assembly and support structure shown in FIG. 4.

FIG. 6A is a schematic top plan view of one cell of the cellular wind turbine assembly shown in FIGS. 1 and 2 modified with a means for keeping the assembly facing into the prevailing wind.

FIG. 6B is a schematic side elevation of the cell shown in FIG. 6A.

FIG. 10A is a schematic top plan view of a floating power generation assembly comprising seven wind turbines of the form shown in FIG. 9 and three anchors.

FIGS. 10B to 10F are schematic top plan views, similar to that of FIG. 10A, showing five additional floating power generation assemblies of the present invention comprising differing numbers of wind turbines, connecting cables and anchors.

FIG. 11 is a schematic side elevation, generally similar to that of FIG. 9 showing a modified version of the wind turbine of FIG. 9 provided with auxiliary cables.

FIG. 12A is an enlarged three quarter view of the base section of the wind turbine of FIG. 11.

FIG. 12B is an enlarged three quarter view, generally similar to that of FIG. 12A, of a modified base section which can be substituted for that shown in FIG. 12A.

FIG. 12C is a section, in a vertical plane including the axis, of the modified base section shown in FIG. 12B.

FIG. 13A is an enlarged side elevation of the buoyancy section of the wind turbine shown in FIG. 11.

FIG. 13B is a side elevation, generally similar to that of FIG. 13A, of a modified buoyancy section which can be substituted for that shown in FIG. 13A.

FIGS. 14A and 14B are horizontal sections in the planes indicated by arrows A and B respectively in FIG. 13B.

FIG. 15 is a schematic side elevation, similar to that of FIG. 11, of a modified wind turbine including the modified buoyancy section of FIG. 13B, FIG. 15 showing alternative locations for attachment of auxiliary cables.

FIGS. 16A to 16E are schematic side elevations, similar to that of FIG. 15, showing how the wind turbine of FIG. 15 reacts to wave motion.

FIG. 21A is a schematic side elevation of a preferred apparatus for carrying out the deployment process of the present invention, the apparatus being mounted on the deck of a ship.

FIG. 21B is a schematic top plan view of the apparatus shown in FIG. 21A.

FIG. 22A is a schematic side elevation, similar to that of FIG. 21A, showing the apparatus pivoted to a vertical position.

FIGS. 26A to 26C are schematic side elevations, similar to those of FIGS. 25A to 25D, showing a modified placement process using an external floatation device on the wind turbine.

FIGS. 27A to 27G show various modified forms of the apparatus shown in FIGS. 21 to 23.

DETAILED DESCRIPTION

As already indicated, the present invention has three main aspects, namely a floating power generation assembly, a deployment process, and a cellular wind turbine assembly. These three aspects of the invention will mainly be described separately below, but it will be appreciated that a single assembly or process may make use of multiple aspects of the invention. For example, a floating power generation assembly may include cellular wind turbine assemblies of the invention, and the floating units of the floating power generation assembly may, and indeed are primarily intended to be, placed on site by the deployment process of the invention.

Figure 1:
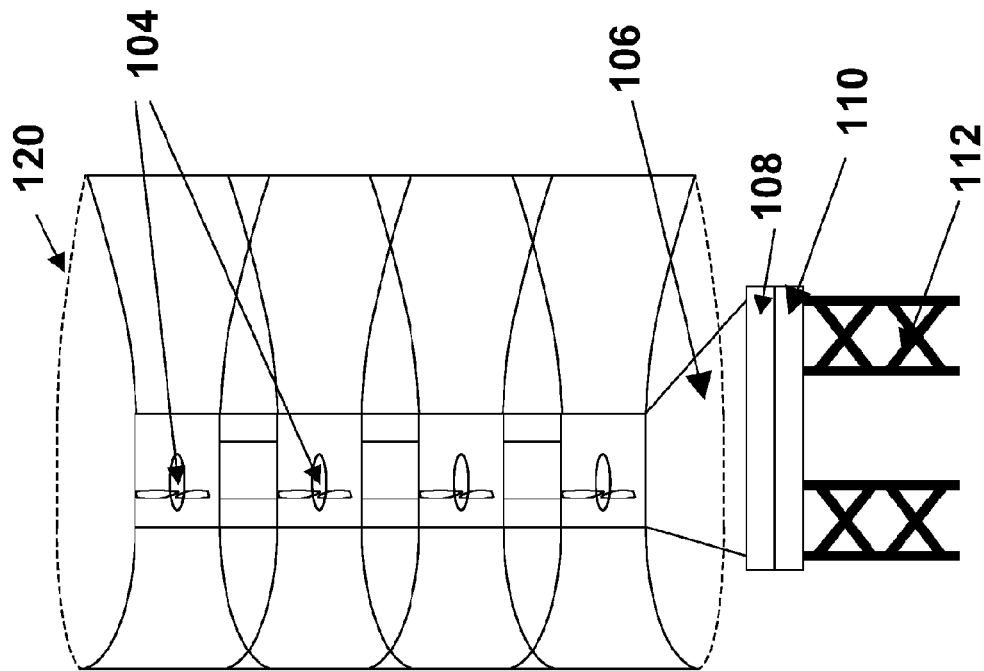
FIG. 1 of the accompanying drawings is a schematic front elevation (looking from the inlets of the cells) of a cellular wind turbine assembly of the present invention.
Figure 2:
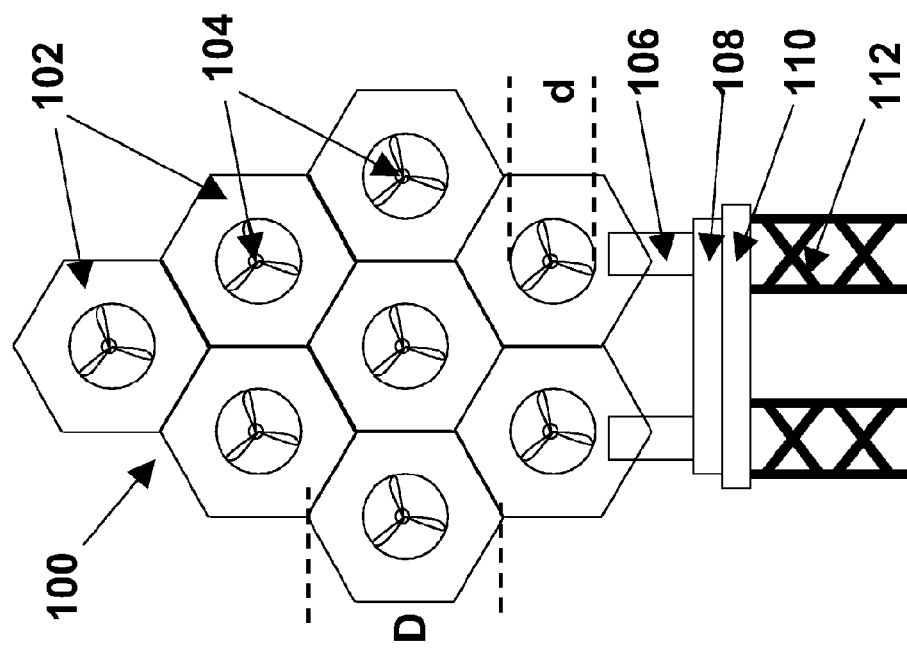
FIG. 2 is a schematic side elevation of the cellular wind turbine assembly shown in FIG. 1.
Figure 3:
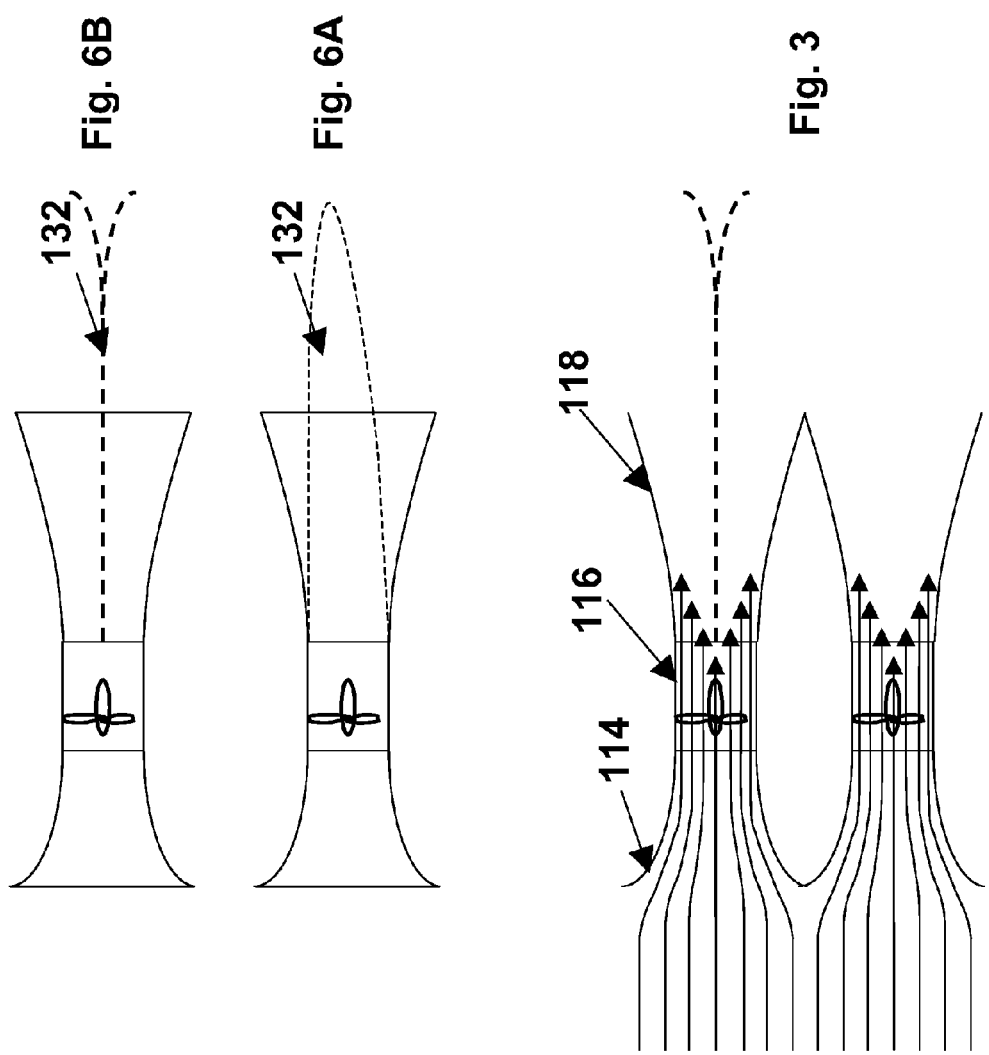
FIG. 3 is a schematic horizontal section through two cells of the cellular wind turbine assembly shown in FIGS. 1 and 2, showing the air flow through these cells.

One form of the wind turbine assembly of the present invention, which might be used in a land-based wind farm, will now be described in detail with reference to FIGS. 1 to 3 of the accompanying drawings, in which FIG. 1 is a schematic front elevation of the preferred wind turbine assembly (generally designated 100), FIG. 2 is a schematic side elevation of the assembly 100 and FIG. 3 is a schematic section taken in a horizontal plane through two adjacent units of the assembly 100 and showing the air flow through these units.

As shown in FIGS. 1 and 2, the wind turbine assembly 100 comprises a plurality of individual unit or cells 102, each of which contains a single turbine 104 mounted for rotation about a horizontal axis. The cells 102 have the form of hexagonal prisms with horizontal axes. The wind turbine assembly 100 further comprises support pillars 106 mounted upon a yaw control (rotatable) base 108, which is in turn supported upon a fixed base 110 supported by support members 112, which can be of any convenient type and are indicated in only the most schematic manner in FIGS. 1 and 2. The yaw control base 108 permits the wind turbine assembly 100 to rotate so as the face the wind being experienced.

The size of the cells 102 and the turbines 104 can vary widely; the turbines 104 may be of substantially the same size as those used in conventional single mast/single rotor units (with a rotor say 30 to 47 meters in diameter) or they may be substantially smaller. For example, the diameter d of each turbine 104 might be about 8 meters, while the height D of each cell 102 (i.e., the diameter of the circumcircle of the hexagonal front elevation of the cell 102) might be about 10 meters.

Each cell 102 comprises an airfoil member best seen in FIG. 3. The airfoil member could be made, for example, from carbon-fiber reinforced polymer, in the case of smaller cells, or aluminum or stainless steel in the case of larger cells. The airfoil member has an intake section 114, a cylindrical section 116 within which the turbine 104 of the cell 102 is located, and an outlet section 118. The intake section 114 may have a complex, substantially frustopyramidal/frustoconical form which transitions from a hexagonal intake (as seen in FIG. 1) to a circular cross-section adjacent the cylindrical section 116. (The diameter of the cylindrical section 116 is of course essentially the same as that of the turbine 104, since to maximize power output from the turbine, there should be minimal clearance between the tips of the turbine blades and the inner surface of the cylindrical section 116.) Alternatively, the intake section may have a form which is essentially of circular cross-section throughout, making a smooth transition from the circular cross-section adjacent the cylindrical section 116 to the circumcircle of the hexagonal intake, but with the circular cross-sections truncated by the sides of a hexagonal prism extending perpendicular to the edges of the hexagonal intake. Such a "truncated conical" intake section will have forward edges which are concave as viewed from the same position as FIG. 1. In another alternative construction, the airfoil member could have an internal form which provides one continuous curve extending throughout the full length of the airfoil member, so that there would not be discrete intake, cylindrical and outlet sections. The intake section 114 serves an as air intake for the turbine 104, collecting moving air provided by wind impinging upon the assembly 100 and accelerating the velocity of this moving air before it reaches the turbine 104, thus providing the turbine 104 with an effective wind speed higher than that of the prevailing wind and increasing the output from the turbine 104 above the output which would be achieved simply by exposing the turbine 104 to the prevailing wind. The taper of the intake section 114 and the resultant acceleration of the moving air entering this intake section enable the turbines 104 to make use of all the wind impinging upon the front face of the assembly 100 even though the combined area of the circles traversed by the blades of the turbines 104 is only about one-half of the area of the front face of the assembly 100. (The ratio between the area of the circles traversed by the blades and the area of the front face of the assembly 100 can vary considerably; see the discussion of the ratio d/D below.) The exact form of the inner surface of each intake section 114 resembles the upper surface of an airplane wing, and is aerodynamically designed to maximize the wind velocity experienced by the associated turbine 104 and minimize drag on the air passing through the cell 102.

The wind speed experienced by each turbine 104 depends upon the ratio d/D, where d and D are as already defined. The ratio d/D can be varied depending upon economic considerations and site conditions, including the maximum wind velocities which the assembly 100 may need to withstand. Increasing d/D reduces drag within the intake section 114 and thus enables the use of a lighter support structure (as described below), while lowering d/D increases the wind speed experienced by the turbine 104 and thus enables the same power output to be obtained from smaller, lighter turbines running more efficiently. Thus, in at least some cases, it may be desirable to vary the d/D ratio within a single assembly, the cells 102 near the base of the assembly having a low d/D ratio and the cells 102 near the top of the assembly having a higher d/D ratio. Typically d/D will not be greater than about 0.95. Preferably, d/D will not be greater than about 0.8.

Figure 8A:
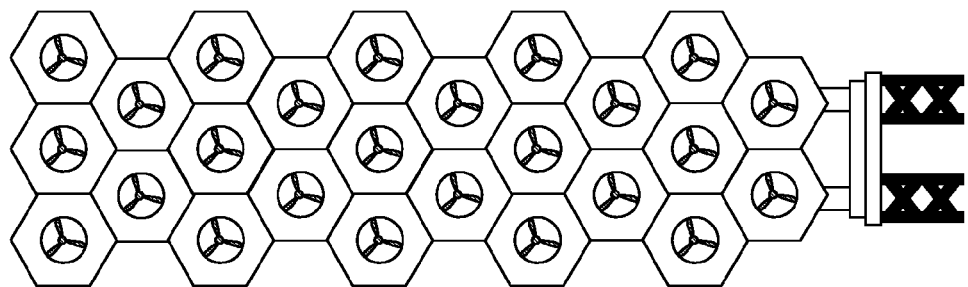
FIGS. 7, 8A and 8B are schematic front elevations, generally similar to that of FIG. 4, of three further cellular wind turbine assemblies of the present invention, together with their support structures.
Figure 8B:
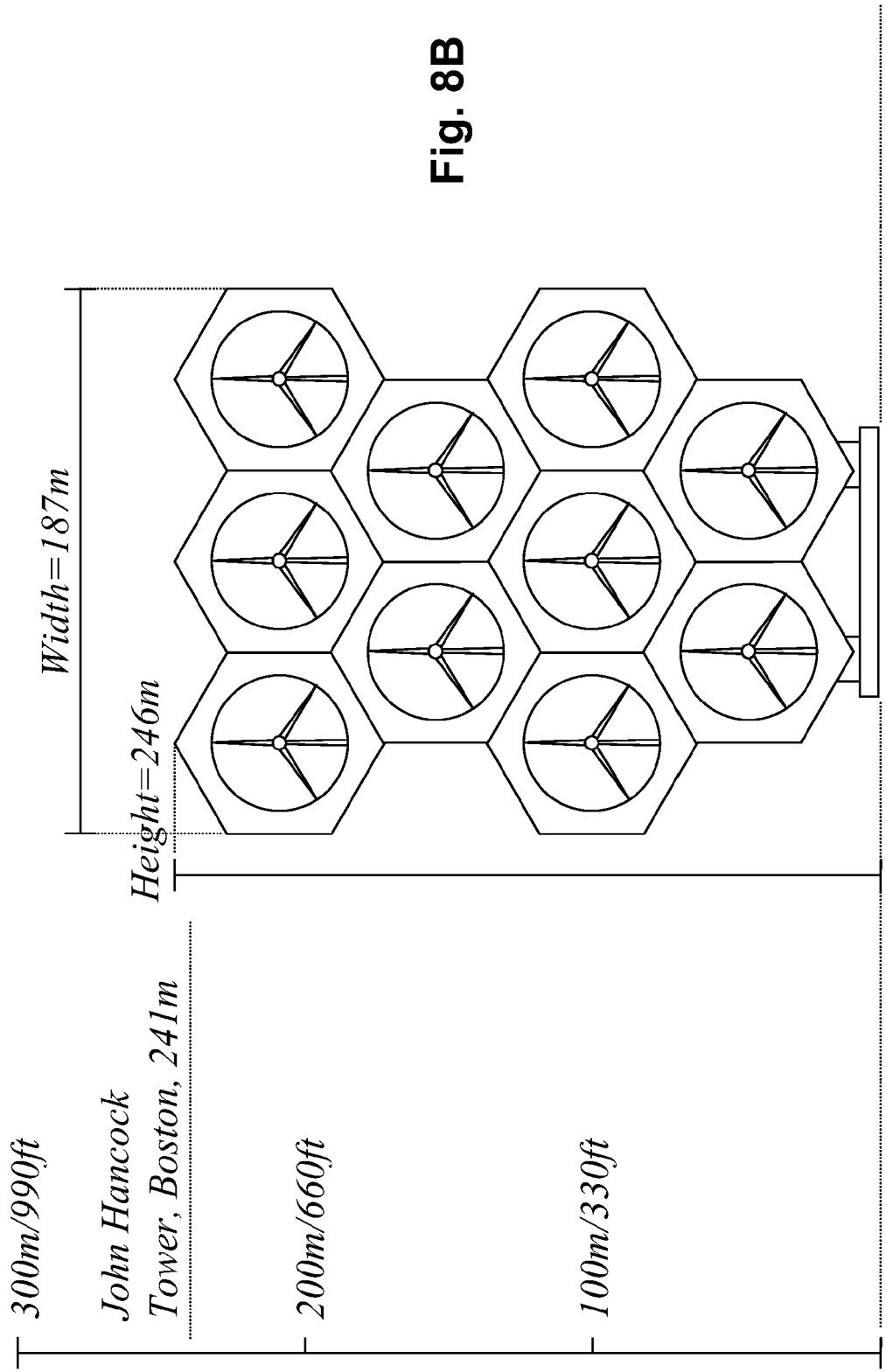

The acceleration of wind velocity provided by the intake section 114 is important in increasing the power provided by the turbines 104. For example, consider a hexagonal cell of the type shown in FIG. 1 with a d/D ratio of 0.65. The area of the hexagonal intake will be $0.6495 D^2$, while the area of the circular section in which the turbine rotates will be $0.7854 d^2$, which is equal to $0.33 D^2$. The ratio of these two areas is 1.96, and thus (ignoring frictional and viscous losses) this will be the maximum factor by which the wind velocity can be accelerated. A reasonable estimate of losses would suggest an acceleration factor of about 1.72, and since the power available from a turbine is proportional to the cube of the wind velocity an acceleration factor of 1.72 would achieve a five-fold increase in power output. For example, there is a commercially available turbine with a 47 meter diameter rotor rated at 660 kW. Placing a slightly modified version of this commercially available turbine in an airfoil in accordance with the present invention and with an acceleration factor of 1.72 would boost the output of a single turbine to 3.3 MW, so that an assembly of only ten of such turbines could produce 33 MW, as illustrated in FIG. 8B discussed below.

The provision of the outlet section 118 of the airfoil member is optional, and in some cases it may be convenient to omit this section and simply allow air passing through the turbines 104 to pass unhindered out of the rear (downwind) surface of the assembly 100 thus avoiding the cost of the providing the outlet sections 118 and the increased weight of the assembly caused by these outlet sections. However, omitting the outlet sections 118 means that air leaving the turbines 104 does so over only a small fraction of the area of the rear surface of the assembly 100, which may lead to significant turbulence adjacent this rear surface, and varying stresses upon adjacent parts of the assembly 100. Hence, it is generally desirable to provide each cell with an outlet section 118, in a form generally similar to the inlet section 114, namely a substantially frustoconical form linking the circular outlet end of the cylindrical section 116 to a hexagonal outlet on the rear surface of the assembly 100. The inner surface of the outlet section 118 should be aerodynamically designed to minimize drag.

As indicated in a highly schematic manner in FIG. 2, an outer casing or shell 120 may be provided to cover the outer surfaces of the assembly 100 and to prevent turbulence caused by wind passing over the external surfaces of the airfoils of the cells 102 which lie adjacent these external surfaces. Although the provision of the shell 120 is optional, and the shell may be omitted to reduce the overall cost and weight of the assembly 100, provision of the shell 120 is generally desirable to avoid turbulence around the edges of the assembly 100, and consequent stresses and drag upon parts of the assembly, especially when it is installed in a location which may be subjected to high winds.

Figure 4:
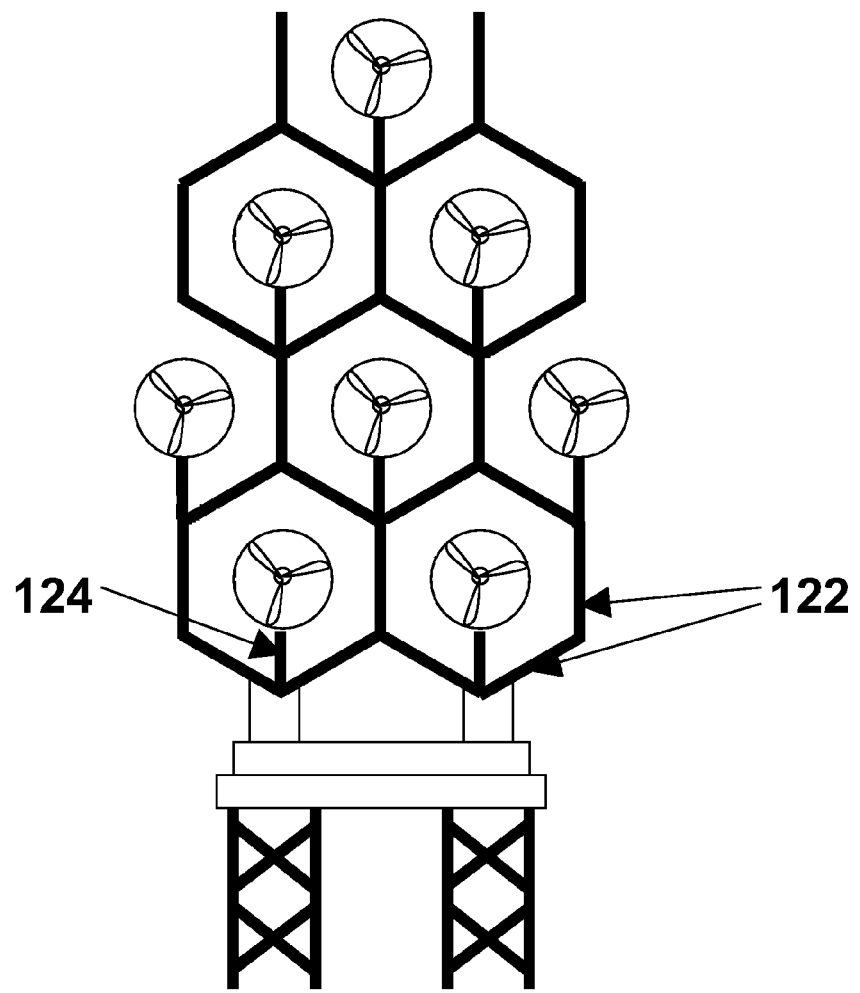
FIG. 4 is a front elevation of the cellular wind turbine assembly shown in FIGS. 1 and 2 together with its support structure.

FIGS. 4 and 5 illustrate the support structure of the assembly 100, FIG. 4 being a schematic front elevation similar to FIG. 1 but with the airfoils removed to show the support structure, and FIG. 5 being an enlarged view of part of one cell of the support structure and its associated turbine, with the airfoil of the cell being indicated by open circles. As shown in FIG. 4, each cell 102 of the assembly is supported by a hexagonal framework 122 from the lower end of which extends a short mast 124 on which the turbine 104 of the cell 102 is mounted. As shown in more detail in FIG. 5, the hexagonal framework 122 actually comprises two parallel frameworks 122A and 122B on the front and rear sides respectively of the turbine 104, these frameworks 122A and 122B being formed from rods 126 inserted into linking pieces 128, so that the frameworks 122A and 122B can be rapidly assembled on site from a small number of standard components. The frameworks 122A and 122B are interconnected at their lower ends by a cross-piece 130 on which the mast 124 is mounted. (Some parts of the framework shown in FIG. 4 may be omitted in some cases; for example, depending upon the strength of the material used to form the airfoils, it may be possible to omit the two vertical members in the uppermost cell in FIG. 4. Also, optionally additional support members may be provided extending at 120° angles to the mast 124; these additional support members may be used to provide support to the airfoil and/or to the turbines 104.)

The yaw control base 108 (FIGS. 1 and 2) can be controlled in various ways, the choice being governed at least in part by the size of the assembly 100. Especially in smaller assemblies, the yaw control base may be controlled by a weather vane, as illustrated in FIGS. 6A and 6B, which are, respectively, side elevation and top plan views of one cell 102 provided with such a vane 132. The vane 132 is provided on the rear surface of the cell 102 and will typically be provided on only some of the cells 102, preferably those in the center of the assembly 100. The vane 132 acts in the same manner as a conventional weathervane and keeps the assembly 100 facing into the prevailing wind. In view of the size and weight of the assembly 100 it may be desirable to provide some form of damping means (for example, frictional or hydraulic dampers) between the yaw control base 108 and the fixed base 110 (FIGS. 1 and 2) to prevent abrupt movements of the yaw control base 108, and especially abrupt reversals of its direction of movement.

Any known systems for keeping the assembly 100 facing into the wind may be employed. For example, especially with large assemblies it may be desirable to provide a sensor for measuring wind speed and direction, and a motorized drive for controlling movement of the yaw control base 108 relative to the fixed base 110; such a motorized drive could, for example, have the form of an electric motor on the yaw control base 108 provided with a pinion engaged with a circular rack provided on the fixed base 110. Again, it may be desirable to damp the movement of the yaw control base 108 relative to the fixed base 110, but in this case damping can be effected in software used to control the motorized drive. Such a system has the advantage that measurements of wind speed could be used to raise an alarm or initiate safety measures if wind speeds reach a point at which damage to the assembly appears likely.

From the foregoing description, it will be seen that the wind turbine assembly of the present invention differs radically from the typical prior art assembly using discrete single mast/single rotor units, in that the wind turbine assembly of the present invention uses a plurality of (typically) small sized wind turbine cells stacked to form the full assembly. Each unit can be identical (or a small number of units differing in, for example, d/D ratio, can be employed) and scalable, and thus easily replaceable for maintenance or upgrading. The relatively small size and weight of the individual cells is also advantageous during construction, repair and maintenance in that it limits the weight which has to be lifted or manipulated at any one time; this may reduce costs by removing the need for very heavy lifting equipment and may also have safety advantages, especially when units need to be lifted at offshore sites exposed to severe weather conditions.

It will be appreciated by those skilled in wind turbine technology that the assembly of the invention previously described can be modified in a number of different ways. For example, the assembly 100 has been shown with hexagonal intakes to the airfoils. This enables the intakes to be stacked with no gaps therebetween, as illustrated in FIG. 1, but does require a rather complex geometric form for the intake sections as they transition from hexagonal intakes to circular outlets, and the manufacture of airfoils having these complex geometric forms may increase manufacturing costs. Alternatively, the airfoil intakes may be made circular (so that the airfoils can maintain circular symmetry throughout their length, which eases manufacturing problems) and the trilobed gaps between the intakes of adjacent airfoils covered with "crevice caps" having substantially the form of squat triangular pyramids, but with the edges of the base of the pyramid curved to conform to the curved edges of the circular airfoil intakes. The use of such crevice caps ensures that all air incident upon the front face of the assembly enters into the airfoil intakes (thus maximizing power output from the turbines) and that no moving air enters between the airfoil intakes, where it might cause undesirable turbulence.

Figure 7:
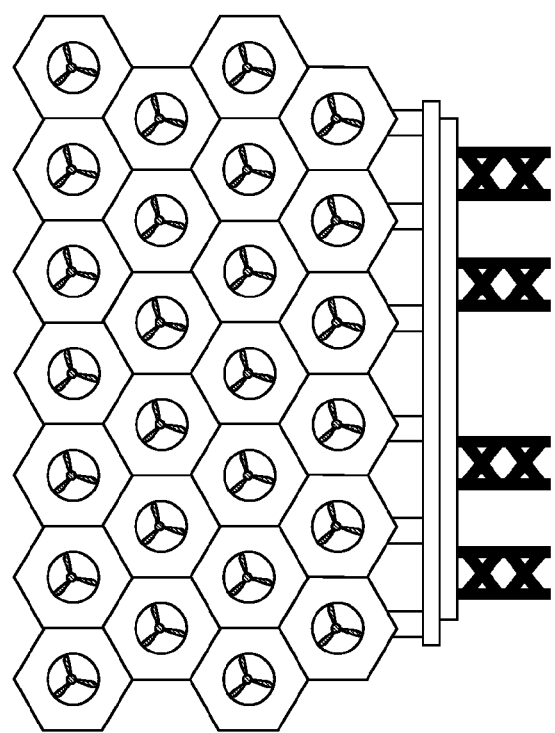

The assembly shown in FIG. 1 is small, comprising only eight cells 102 and in practice substantially more cells would typically be employed in a commercial assembly. FIGS. 7 and 8A illustrate two types of assembly having larger numbers of cells. The assembly of FIG. 7 is in effect produced by extending the assembly of FIG. 1 horizontally without increasing its height, and might thus be useful in an off-shore location relatively close to shore where it is desired to limit the overall height of the assembly to prevent it being seen from shore. In contrast, the assembly of FIG. 8A is in effect produced by extending the assembly of FIG. 1 vertically without increasing its width, and might thus be useful where economic considerations dictate provide a large assembly on a relatively small base. The assembly of FIG. 8A is also well adapted to take advantage of the stronger wind which is often found at substantial distances above the ground or ocean surface.

FIG. 8B illustrates an assembly generally similar to that of FIG. 1 but using large commercially available turbines. FIG. 8B illustrates with dimensions an assembly using ten of the aforementioned 47 meter turbines used with airfoils having a wind velocity acceleration factor of 1.72, so that each turbine generates 3.3 MW and the entire assembly generates 33 MW. Although large, the assembly shown in FIG. 8B is entirely practicable for a land-based wind farm, and in many cases the single large structure may be less objectionable than the 50 scattered single mast/single rotor units which would otherwise be required to generate the same power output. It should be noted that in large turbine assemblies such as that shown in FIG. 8B it is normally not necessary to increase the length of the airfoil is proportion to the diameter of the turbine, i.e., typically the airfoils in FIG. 8B will be shorter relative to the turbine diameter as compared with those in FIG. 1.

As already mentioned, the present invention also provides floating power generation assemblies (typically off-shore wind farms, although the floating power generation assemblies of the invention may make use of other types of power generation means, for example means to derive power from wave motion or water currents), which can be sited in deep water without mounting a rigid structure on the sea bed, or other solid underwater surface. These floating power generation assemblies are described below primarily using conventional wind turbine units of the single mast/single rotor type, but it will readily be apparent to those skilled in wind farm technology that the single mast/single rotor type units could be replaced by cellular wind turbine assemblies of the present invention, as described above.

Figure 9:
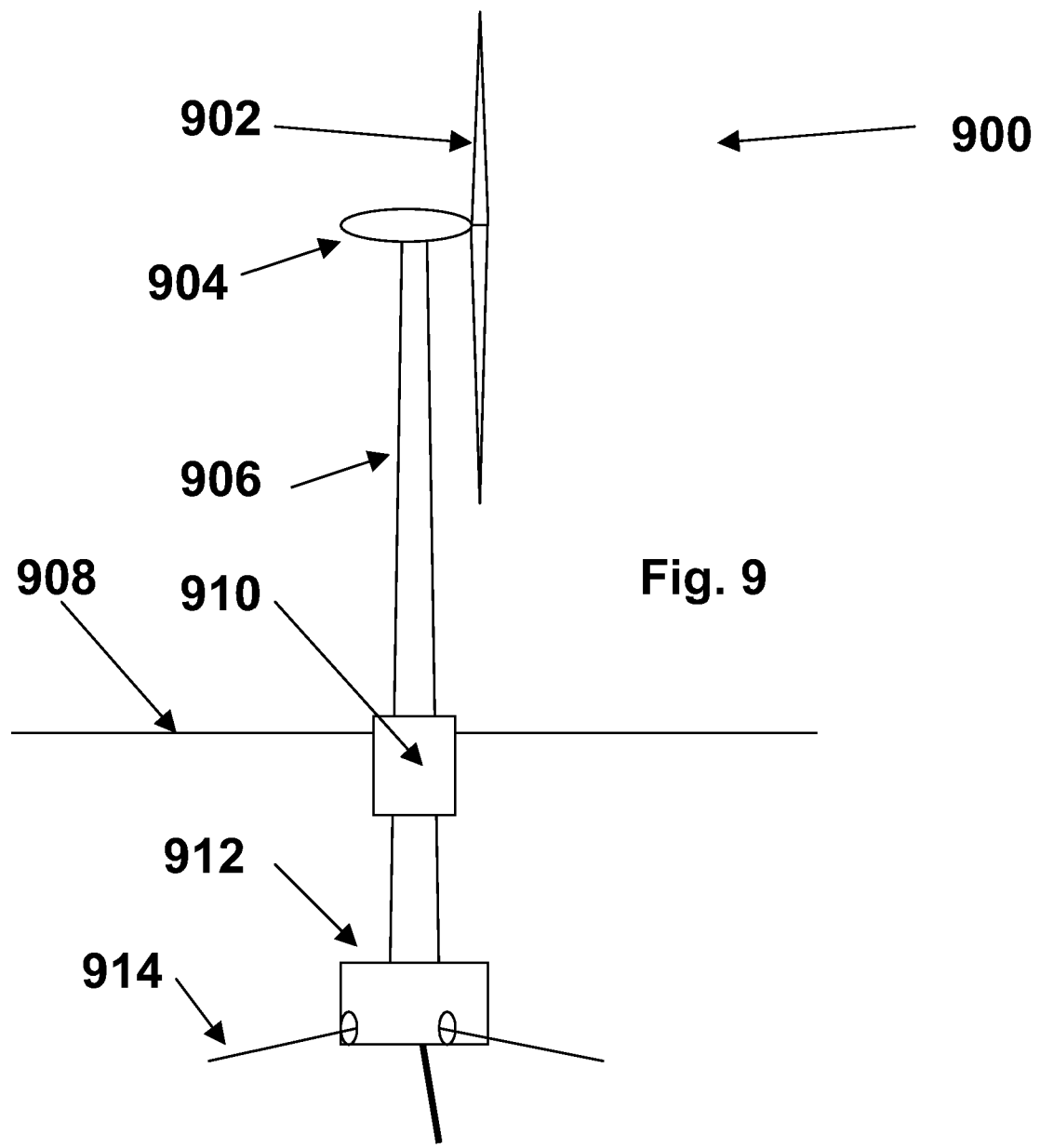
FIG. 9 is a schematic side elevation of a preferred floating wind turbine for use in the floating power generation assemblies of the present invention.

FIG. 9 of the accompanying drawings is a schematic side elevation of a single wind turbine unit (generally designated 900) which can serve one floating unit of a floating power generation assembly (hereinafter for convenience called "a wind farm") of the present invention. The unit 900 comprises a rotor 902 comprising a plurality of blades (typically three) and mounted on a hub 904 for rotation about a horizontal axis sufficiently far above the water that the rotor blades do not contact the water as they rotate; indeed, to ensure that the rotor blades receive the full velocity of the wind unhindered by surface drag, it is desirably that the rotor blades have, at their lowest point, at least 15 meters clearance above water level. The hub 904 houses a generator (not shown) and is supported on a tower or mast 906. Units comprising a rotor and a hub containing a generator are available commercially, and the commercial units can readily be employed in wind farms of the present invention. The commercial units are already provided with means (not shown) to keep the rotor facing the prevailing wind, and with a rotation joint (also not shown) located a short distance below the hub to enable the hub and rotor to turn on a fixed mast, thus minimizing the weight which has to rotate as the rotor turns to face the prevailing wind.

Thus far, the construction of the unit 900 is conventional. However, instead of being secured to a rigid support, either land or sea bed, the unit 900 is designed for anchoring in deep water. As shown in FIG. 9, the mast 906 passes through the ocean surface 908, being surrounded by a buoyancy section or belt 910 which lies at the ocean surface 908 and provides sufficient buoyancy to hold the upper end of the mast 906 at its intended distance above the ocean surface. The lower end of the mast 906 is fixed to a turbine base section 912, which is made heavy enough and located far enough below the ocean surface 908 to ensure that the center of gravity of the entire unit 900 lies a substantial distance below the ocean surface 908. The base 912 is connected to three cables 914, which are connected to other units 900 or to anchors, as described in detail below.

The buoyancy belt 910 serves to ensure that the center of buoyancy of the unit 900 is sufficiently above the center of gravity of the unit to provide stability against wave action. The buoyancy belt 910 also serves to protect the mast 906 against impacts from floating objects.

FIG. 10A is a top plan view of a floating power generation assembly or wind farm comprising ten components, namely seven units 900 and three anchors 916 (one of which is omitted from FIG. 10A to increase the scale of the drawing). As shown in FIG. 10A, the units 900 are arranged at the vertices of a series of equilateral triangles. More specifically, six of the units 900 are arranged at the vertices of a regular hexagon, the sides of which are made long enough (typically at least five times the diameter of the rotor 902 in FIG. 9) that there is substantial separation between the circles 900A which define the maximum area which may be traversed by each rotor 902. The seventh unit 900 is disposed at the center of the regular hexagon. The cables 914 run along all six sides of the hexagon, and also connect the central unit 900 to alternate ones of the units at the vertices of the hexagon. The three anchors 916 are arranged on the sea bed beneath the perpendicular bisectors of alternate sides of the hexagon, and are connected by cables 914 to the units 900 at either end of the adjacent side of the hexagon. Thus, the three anchors 916 are arranged at the vertices of an equilateral triangle, within which are located the units 900, and each of the units 900 forming the hexagon is connected to its two neighboring units 900 and to one of the anchors 916, with alternate units 900 of the hexagon also being connected to the central units 900. Thus, each of the units 900 is connected by the cables 914 to at least three components of the assembly. The anchors 914 serve to hold the seven units 900 stationary against wind and ocean currents. Also, although not shown in FIGS. 9 and 10A, the cables 914 can carry electrical cables through which electricity generated in the hubs 904 can pass into underwater cables (not shown) provided on one or more of the anchors 916. However, it is generally preferred that electrical cables separate from the cables 914 be provided to carry electricity away from the wind farm.

Figure 10F:
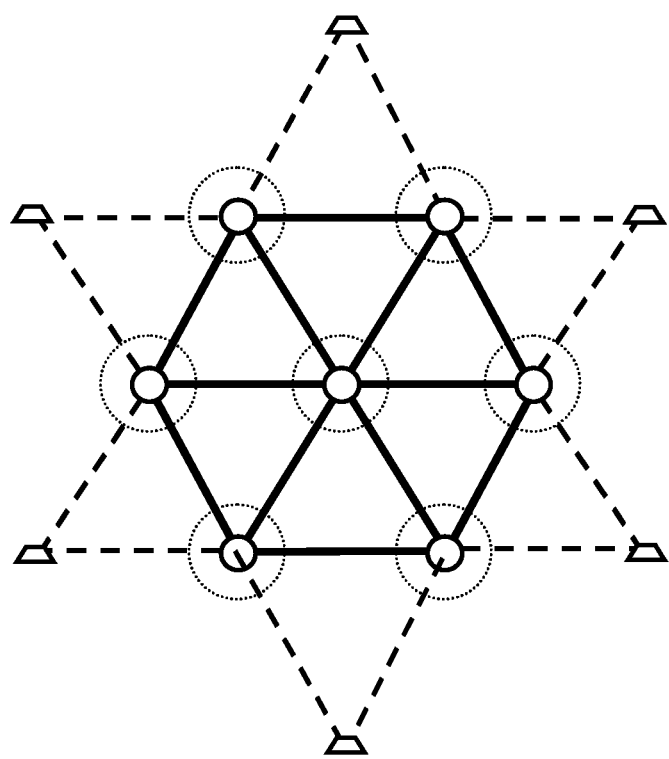

Numerous other arrangements of the units 900 and the anchors 916 may of course be used, and five examples are illustrated in FIGS. 10B-10F. The wind farm shown in FIG. 10B is formed by omitting the cables from alternate sides of the hexagon in FIG. 10A, so that three of the units 900 are connected only to one other unit 900 and to an anchor 916. This type of "open" assembly may be useful in sheltered locations where strong currents and waves are not deemed likely; a mixture of open and closed assemblies may of course be used. FIG. 10C shows a larger assembly, of the same "open" type as that of FIG. 10B but having a fourth anchor disposed at the center of the equilateral triangle formed by the other three anchors; such central anchors are desirable in larger assemblies to prevent excessive drift of some floating units not directly connected to anchors. The 12-floating unit, 5-anchor assembly of FIG. 10D is notionally produced by joining two of the assemblies of FIG. 10B along one open (uncabled) edge and replacing the two anchors connected to the floating units along that edge with a single central anchor disposed midway along that edge. The assembly of FIG. 10E may also be regarded as notionally produced by joining two of the assemblies of FIG. 10B along one open edge, but using a different anchor arrangement. Finally, the assembly of FIG. 10F is essentially a modification of the assembly of FIG. 10A such that the floating unit 900 at the center of the hexagon is connected by cables to each of the six surrounding floating units, while six anchors are provided, each anchor being connected to two of the floating units forming the hexagon, so that each of the floating units forming the hexagon is connected to two anchors. Furthermore, each of the floating units forming the hexagon is connected to five other components (two anchors and three other floating units), while the central floating unit is connected to six other floating units. This high degree of connectivity renders the assembly of FIG. 10F very suitable for locations where difficult weather conditions may be encountered.

As will be apparent to those skilled in wind turbine technology, numerous variations can be made in the unit 900 shown in FIG. 9. For example the unit may incorporate a variety of different types of wind turbine. The rotor 902 could be a conventional three-bladed propeller; such three-bladed propellers are commercially proven, but may give rise to blade resonance issues. Alternatively, the unit 900 could use a vertical axis turbine; such vertical axis turbines avoid the need for a yaw control system to keep the rotor facing the prevailing wind, but have not been commercially proven and may give rise to blade resonance issues. The unit 900 could use a WARP type turbine, as manufactured by ENECO Texas LLC, although full scale turbines of this type have not yet been tested. Finally, as already noted, the unit 900 could use a cellular wind turbine assembly of the present invention, as described above with reference to FIGS. 1-8.

In order to reduce the costs of individual bases, the number of cable mountings thereon could be reduced. The unit shown in FIG. 9 is designed to use a base with six cable mountings, which can accommodate the layouts shown in FIGS. 10A-10E using only one type of base. The number of cable mountings on the base could be reduced to three. However, since not all of the bases shown in FIG. 10A-10E have the same cable layout, multiple types of bases might be needed if the number of cable mounting were reduced.

A commercial wind farm would typically make use of larger numbers of units 900 than shown in FIG. 10A. The arrangement shown in FIG. 10A might be regarded as a pilot plant suitable for an extended commercial test; since the individual units 900 would typically be rated at 2.0 to 3.6 MW, the arrangement shown in FIG. 10A might have an output of about 20 MW. Thus, a commercial wind farm might use 5 to 10 of the arrangements shown in FIG. 10A (i.e., 35 to 70 individual units 900) for a total output of 100 to 200 MW. Examples of larger wind farms are discussed with reference to FIGS. 20A to 20F below.

One possible objection of floating wind farms, especially near shipping lanes, is the risk that a floating unit might break away from its anchors in severe weather and pose a hazard to navigation. To minimize this danger, at least some of the individual units 900 could be equipped with global positioning system (GPS) units arranged to provide position indications to an operator on shore, who could thus detect when any unit drifts too far from its expected position, and takes steps to retrieve the unit and issue an appropriate warning to shipping.

FIG. 11 is a schematic side elevation, similar to that of FIG. 9, of a floating unit (generally designated 1100) which is a essentially a modified version of the unit 900 shown in FIG. 9. Most parts of the unit 1100 are similar to those of FIG. 9 and are labeled accordingly, but there are three major differences between the two units. Firstly, the base section 912 of unit 900 is replaced with a smaller base section 1112 which has substantially the form of a disc made of reinforced concrete. This base section 1112 may optionally be provided with a tension member tethered to the seabed. Secondly, the cylindrical buoyancy section 910 of unit 900 is replaced by a shorter buoyancy section (generally designated 1110) comprising a central cylindrical section 1110A capped at either end by frustoconical sections 1110B, 1110C which provide a smooth transition between the large diameter of the central section 1110A and the portions of the mast immediately above and below the buoyancy section 1110. The frustoconical sections 1110B, 1110C help reduce peak mechanical loads on the unit 1100 and minimize high frequency wave induced motions, especially heave.

The most important difference, however, between the units 900 and 1100 is the provision in the latter of auxiliary cables 1114 which run from the upper end of section 1110A to cables 914, the junctions between cables 1114 and 914 being a substantial distance from the unit 1100. The auxiliary cables 1114 provide additional stability against wave and wind action to the unit 1100. (In some cases, the auxiliary cables 1114 could be connected to an anchor rather than to one of the cables 914.)

The unit 1100 will typically be of substantial size and weight (all reference hereinafter to tons are to metric tons). The hub 904 may be 60 meters above the water surface 908, and this hub, together with the rotor 902 may weigh 100 tons. The remaining portion of the mast above the water may weigh 120 tons and the buoyancy section a further 120 tons. The subsurface section of the mast, equipped with ballast tanks, may have a weight varying from 160 (empty) to 1000 tons (ballasted), and the base section 1112, which is intended to rest 65 meters below the water surface 908 to avoid surface wave conditions, may weight 700 tons, for a total weight of 1000 to 2300 tons for the entire unit 1100. When the ballast tanks are full, the center of gravity of the unit, indicated by arrow G in FIG. 11, is 40 meters below the water surface, while the center of buoyancy, indicated by arrow B, is 20 meters below the water surface, giving a metacentric height of 20 meters. These dimensions are designed so that 300 kNewtons of force of the hub 904 will be offset by only 4 degrees of inclination for the 20 meters metacentric height. The size of the ballast tanks is designed to allow deep submersion for operation and shallower submersion for maintenance and construction.

FIGS. 12A, 12B and 12C show one possible modification of the unit 1100, namely a change in the form of the base section 1112. FIG. 12A is an enlarged view of the base section 1112 shown in FIG. 11, this base section 1112 being in the form of a disc about 12 meters in diameter and 1.5 meters thick. FIG. 12B shows a view similar to that of FIG. 12A of a modified base section having a disc 1112' around the periphery of which is formed a hoop or collar 1113, which increases the hydrodynamic mass of the base section to reduce heave motion from surface wave forces and lengthen the natural period of heave. FIG. 12C is a section in a vertical plane including the axis of base section 1112' and shows the cross-section of collar 1113.

FIGS. 13A, 13B, 14A and 14B show a further modification of the unit 1100, namely a change in the form of the buoyancy section. FIG. 13A is an enlarged view of the buoyancy section 1110 shown in FIG. 11. FIG. 13B shows a view similar to that of FIG. 13A of a modified buoyancy section, which is notionally produced by moving buoyancy section 1110 below water surface 908 as indicated at 1110', placing a plate 1320 having essentially the form of a "three-pointed star" above the water surface and connecting buoyancy section 1110' to plate 1320 by four narrow vertical pillars 1322. FIGS. 14A and 14B are horizontal sections in the planes A-A and B-B respectively in FIG. 13B, and show the arrangement of the pillars 1322. (Although four pillars 1322 are shown in FIGS. 13B, 14A and 14B, three pillars could alternatively be used, with the central pillar being omitted and the space thus cleared on the buoyancy section 1110' used to provide an access door to this section.) The modified buoyancy section is designed to produce a reduced cross-sectional area at the water surface, thereby reducing the effects of wave action on the unit 1100.

FIG. 15 illustrates the manner in which auxiliary cables 1114 may be used with the modified buoyancy section shown in FIGS. 13B, 14A and 14B. As indicated in FIG. 15, the auxiliary cables 1114 may be attached either to buoyancy section 1110', preferably to the upper end thereof, or (as indicated by the broken line in FIG. 15), to the plate 1320 above the water surface.

The low center of gravity of the unit shown in FIG. 15 provided by the heavy base 1113, and the substantial metacentric height (i.e., separation between this center of gravity and the center of buoyancy of the unit) render the unit very stable against wave action. FIGS. 16A-16E illustrate the stability of the unit against high waves, with FIG. 16A showing the unit in a trough, FIG. 16E showing the unit on a crest, and FIGS. 16B-16D showing the unit at intermediate positions. In each case, the ocean surface under the high wave conditions is denoted "H", while the same surface under calm conditions is denoted "C". It will be seen from FIGS. 16A-16E that there is no danger of the rotor being damaged by contact with the ocean surface even under these extreme high wave conditions.

Figure 18:
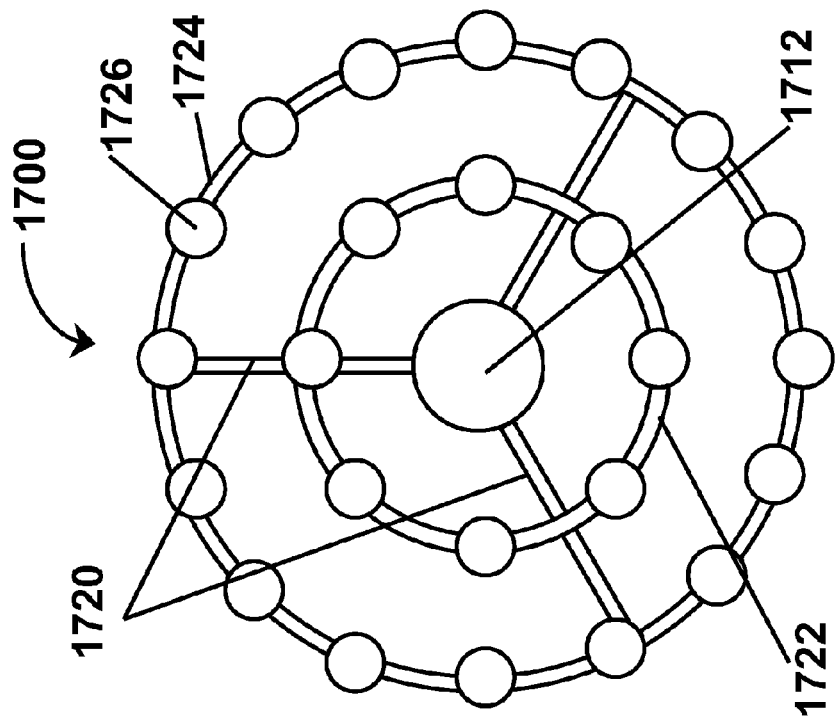
FIG. 18 is a schematic top plan view of the base section of the modified wind turbine of FIG. 17.
Figure 17:
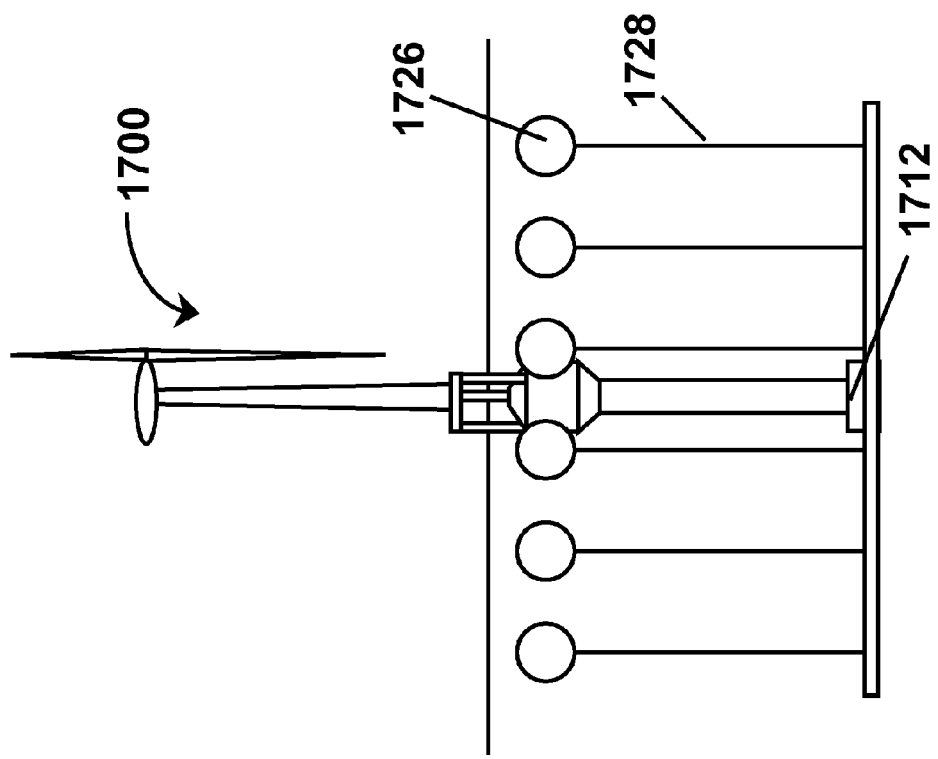
FIG. 17 is a schematic side elevation, generally similar to that of FIG. 15, showing a modified version of the wind turbine of FIG. 15 arranged to generate additional power from wave motion.

One advantage of off-shore wind farms, and especially deep water off-shore wind farms, over similar land-based wind farms is that the off-shore wind farms can make use of renewable energy sources in addition to wind; in particular, off-shore wind farms can make use of wave energy and/or the energy of marine currents. For example FIGS. 17 and 18 are respectively side elevation and top plan views of a unit (generally designated 1700) which is generally similar to the unit shown in FIG. 15 described above except that it is equipped for wave energy power generation. As shown in FIGS. 17 and 18, the base 1712 of the unit 1700 is provided with three symmetrically spaced horizontally extending ribs 1720, which carry inner and outer circular members 1722 and 1724 respectively. The circular members 1722 and 1724 are connected to float members 1726 by cables 1728, these float members, when moved by wave action, move the cables 1728 relative to the circular members 1722 and 1724, thus serving to generate energy from waves in a known manner.

Figure 19:
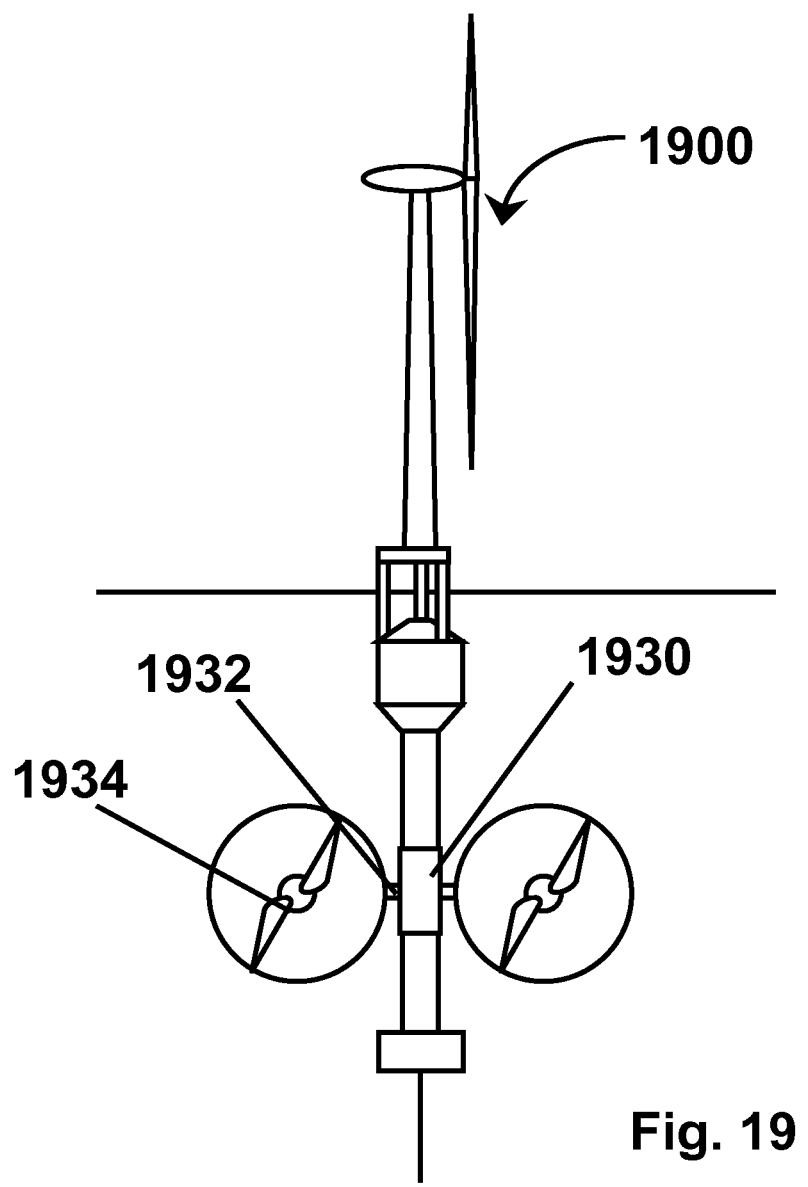
FIG. 19 is a schematic side elevation, generally similar to those of FIG. 15, showing a further modified version of the wind turbine of FIG. 15 arranged to generate additional power from water currents.

FIG. 19 is a side elevation of another unit (generally designated 1900) which is again generally similar to the unit shown in FIG. 15 except that it is equipped for power generation from ocean currents. The mast of unit 1900 is provided with a collar section 1930, which is pivotable relative to the mast and which carries two arms 1932 extending horizontally in opposite directions from the section 1930. The free ends of the arms 1932 carry hubs 1936, on which are mounted rotors 1934 which can rotate under the influence of marine currents, thereby driving generators (not shown) located within the hubs 1936. Electricity from the generators is fed via cables (not shown) in the arms 1932 and the section 1930 to the mast, and thence via cables in the same way as previously described.

The deep water off-shore wind farms described above with reference to FIGS. 9 to 19 have the advantage of being readily deployable in much deeper water than conventional shallow water off-shore wind farm; thus the deep water off-shore wind farms greatly increase the number of potential sites for wind farms, are less likely to draw complaints concerning noise or esthetics, and can make use of the stronger and steadier winds of deep ocean waters. As shown with reference to FIGS. 16A-16E, wind farm units of the present invention can be made highly resistant to wave action, and interconnecting the units in the manner already described further reduces the chances that units may be tipped, and thus damaged, by wave or storm action. The wind farm units of the present invention can readily be manufactured so that each component (for example, the turbine, the base and the buoyancy belt) can be made easily replaceable for maintenance, repair or upgrading.

The present invention is not, of course, confined to direct supply of electricity from the wind farm; instead the wind farm may make use of the electricity generated in other ways. For example, a wind farm can be arranged so that the electricity generated is used to generate hydrogen, typically by electrolysis of water, and resultant hydrogen piped off-site. In the case of off-shore wind farms, it may be convenient for the wind farm to generate hydrogen which can then be piped ashore, rather than supplying the electricity to shore via an undersea cable. (The "decoupling" of the electricity generated at the wind farm from the on-shore electric power grid effected by the generation of hydrogen in this manner avoids the problems which wind farms may otherwise pose in terms of affecting the quality of the electric supply on-shore, and thus may avoid the limitations which some power companies place on the proportion of wind power which they deem acceptable.) Alternatively, the hydrogen could be accumulated at the wind farm, in either gaseous or liquid form and then removed by tanker. Since a wind farm operating in this manner requires no direct connection to shore, it can be positioned at greater distances off-shore.

Figure 20C:
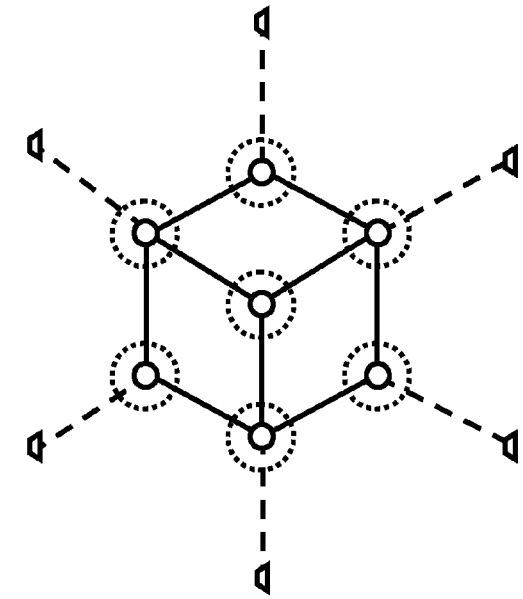
FIGS. 20A to 20J are schematic top plan views, generally similar to those of FIGS. 10A-10F, of additional floating power generation assemblies of the present invention.
Figure 20B:
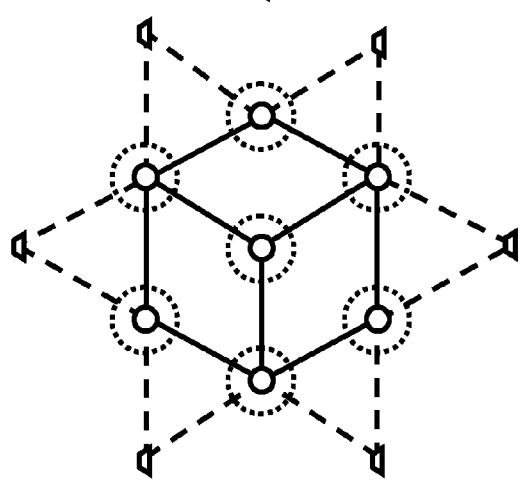
Figure 20A:
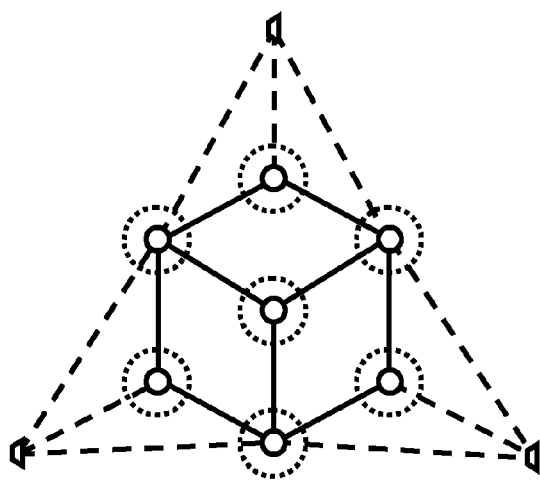
Figure 20D:
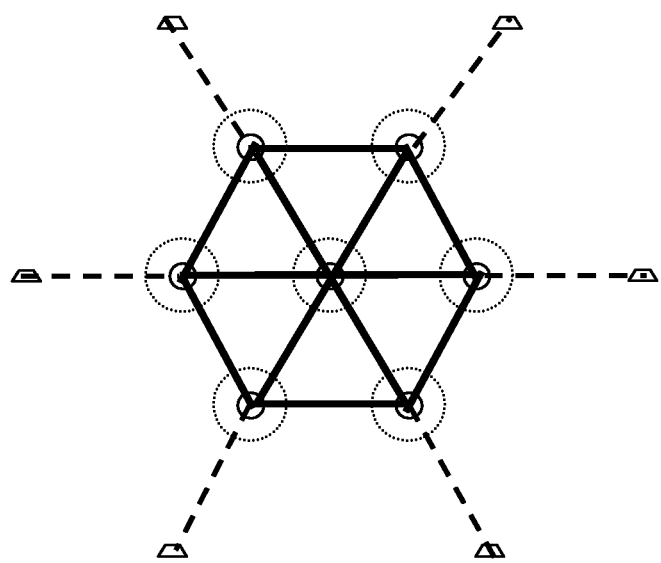

FIGS. 20A to 20J illustrate top plan views, similar to those of FIGS. 10A to 10E, of further wind farms of the present invention, and illustrate variations in the arrangements of anchors, and the way in which multiples of the smaller wind farms previously described may be used to form large, high output wind farms. The optimum arrangement of anchors, balancing the cost of additional anchors and their associated cables against the risk to the wind farm being disrupted or damaged by strong winds, waves or currents, varies greatly with local conditions such as depth, marine currents, tides, and anticipated wave situations, including for example the possibility of hurricanes or similar major storms. The anchor arrangements shown in FIGS. 20A, 20B and 20C are designed to provide stronger anchoring arrangements than that of FIG. 10A. The arrangement of FIG. 20A is essentially a modified form of the arrangement of FIG. 10A, with each anchor 916 connected to three adjoining units 900 of the hexagon. The arrangement of FIG. 20B is another modification of the arrangement of FIG. 10A, with the provision of three additional anchors 916, each connected to two adjoining units 900 of the hexagon, so that each unit in the hexagon is connected to two spaced anchors, thus restraining the wind farm from overall rotation in azimuth. The arrangement of FIG. 20C also uses six anchors arranged in a hexagon, but with each anchor only connected to one unit in the hexagon. The arrangement of FIG. 20D is similar to that of FIG. 20C, but with the central floating unit connected to all six floating units of the hexagon to provide maximum stability in exposed locations.

Figure 20F:
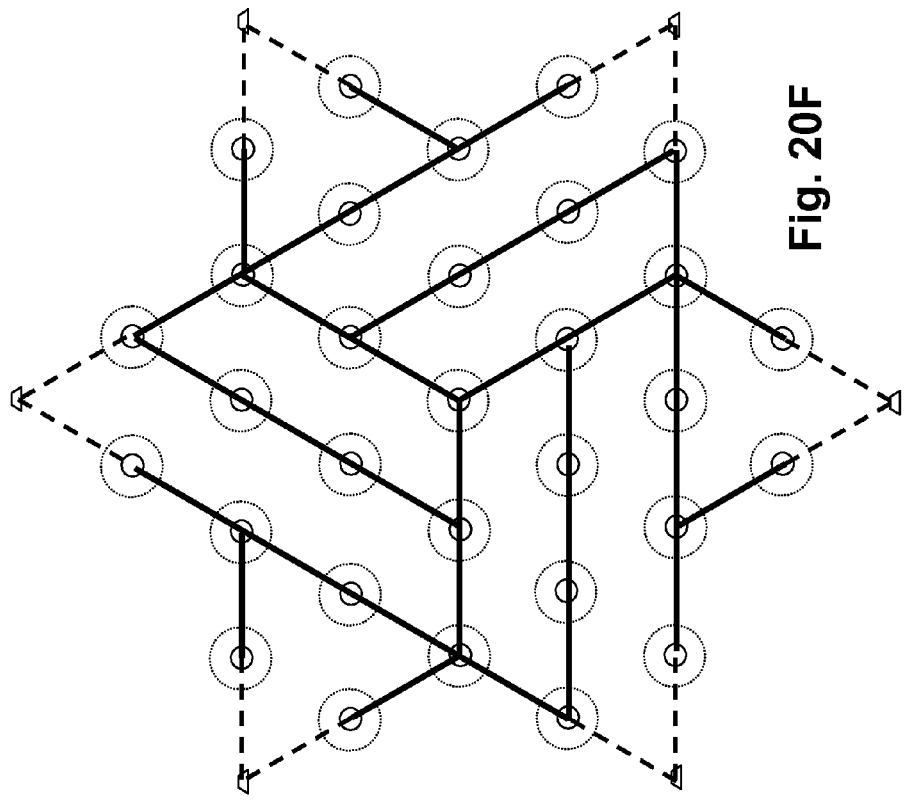
Figure 20E:
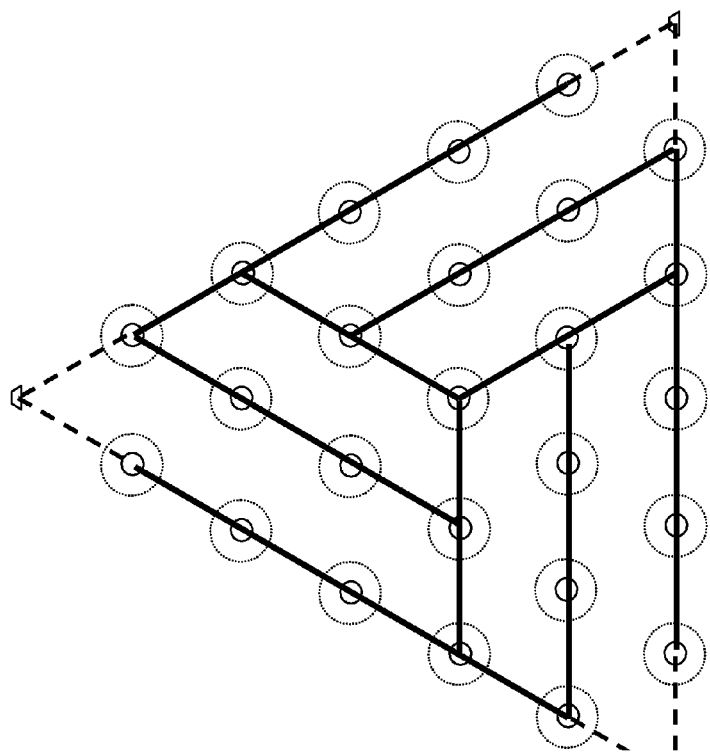
Figure 20H:
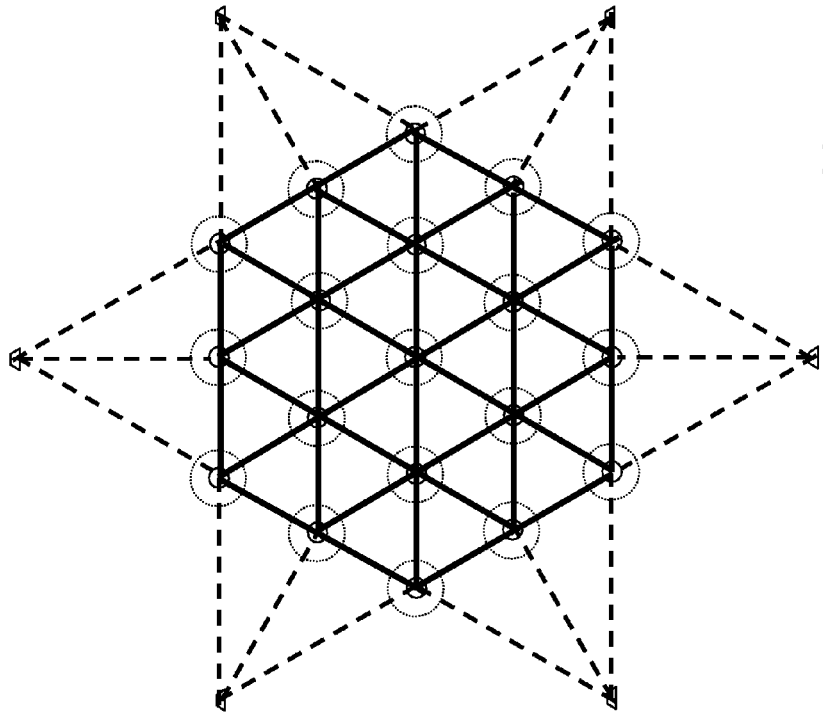
Figure 20G:
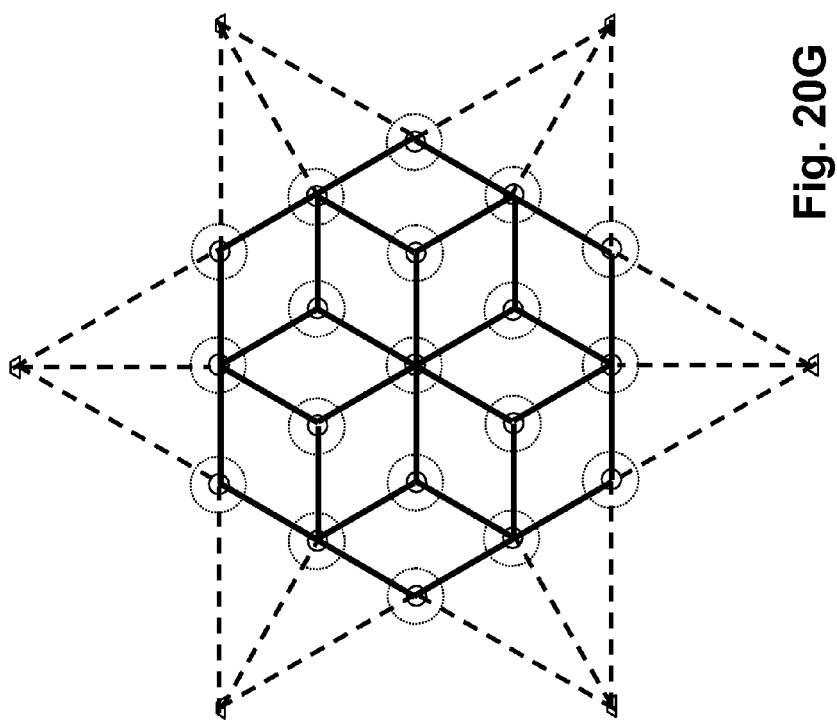
Figure 20J:
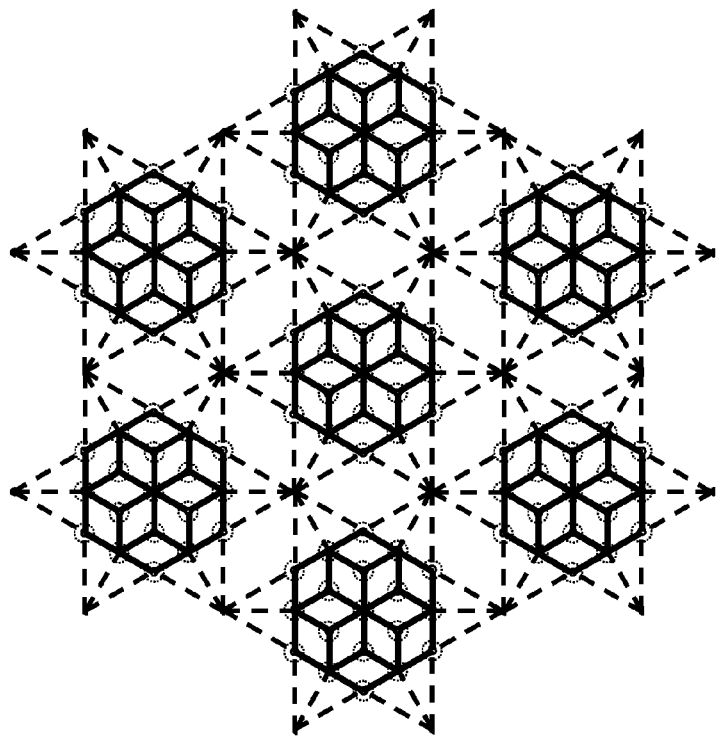
Figure 20I:
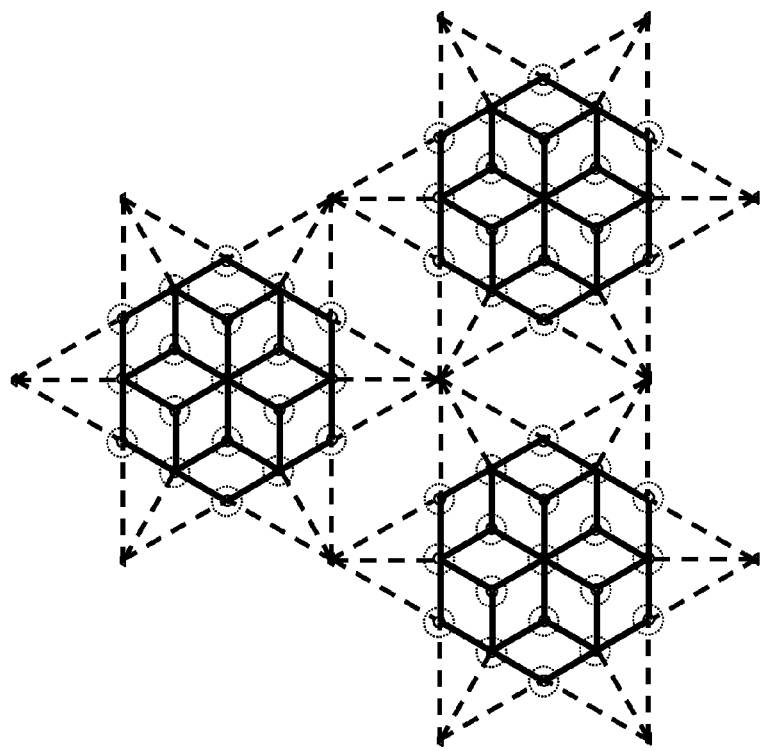

FIGS. 20E to 20J illustrate larger wind farms. FIG. 20E illustrates a 25 floating unit, 27 cable, 3 anchor farm which is essentially an extended version of the farm of FIG. 10C; in FIG. 20E, the central floating unit may be replaced by an anchor (cf. FIG. 10C) for greater stability. FIG. 20F illustrates a 31 floating unit, 33 cable, 6 anchor farm designed for somewhat greater stability than the unit of FIG. 20E; again, the central floating unit may be replaced by an additional anchor. FIG. 20G illustrates a 19 floating unit, 30 cable, 6 anchor "expanded hexagon" farm which may be regarded as produced by superimposing six of the farms of FIG. 20B and providing anchors only around the periphery of the farm, with each anchor connected to the three adjacent floating units. FIG. 20H illustrates a similar expanded hexagon wind farm designed for somewhat greater stability than the farm of FIG. 20G, and which may be regarded as produced by superimposing six of the farms of FIG. 20C. FIGS. 20I and 20J illustrate large wind farms which would have outputs comparable to land-based non-wind farm power stations. The 57 floating unit, 90 cable, 13 anchor farm of FIG. 20I may be regarded as formed using three of the farms of FIG. 20G with sharing of anchors where possible, and similarly the 133 floating unit, 210 cable, 24 anchor farm of FIG. 20J may be regarded as formed using seven of the farms of FIG. 20H with sharing of anchors where possible. It should be noted that in the center of the wind farm of FIG. 20I there is shown a central anchor connected to nine floating units in a symmetrical manner. If weather and current conditions do not require an anchor at this position, this central anchor may be eliminated and the nine cables simply connected to each other, either directly or via some buoy or other device provided with appropriate cable mountings. The wind farm of FIG. 20J has six similar points where nine cables are connected to a single anchor in a symmetrical manner, and in some cases it may be possible to eliminate some or all of these six anchors and simply connect the cables to each other.

The deployment processes of the present invention will now be discussed. As indicated above, the floating units 900 and 1100 used in the floating power generation assemblies of the present invention can weigh up to 2000 tons even with empty ballast tanks and may be more than 120 meters in height. Outer ocean deployment of such large heavy units in conventional marine cranes is severely limited by weather conditions and hence a more stable and reliable deployment process is needed to achieve reliable deployment at lower cost. The deployment process of the present invention is designed to achieve these goals.

FIGS. 20K to 20N illustrate, in a highly schematic manner, the manner in which the anchors and cables needed to form a floating power generation assembly are assembled and the floating units attached to the anchors and cables. For simplicity, FIGS. 20K to 20N illustrate the assembly of the floating power generation assembly of FIG. 20D, which has seven floating units and six anchors, since it is believed that the necessary modifications of the process needed to assemble more complex layouts will readily be apparent to those skilled in the art of deploying anchored floating units.

Figure 20K:
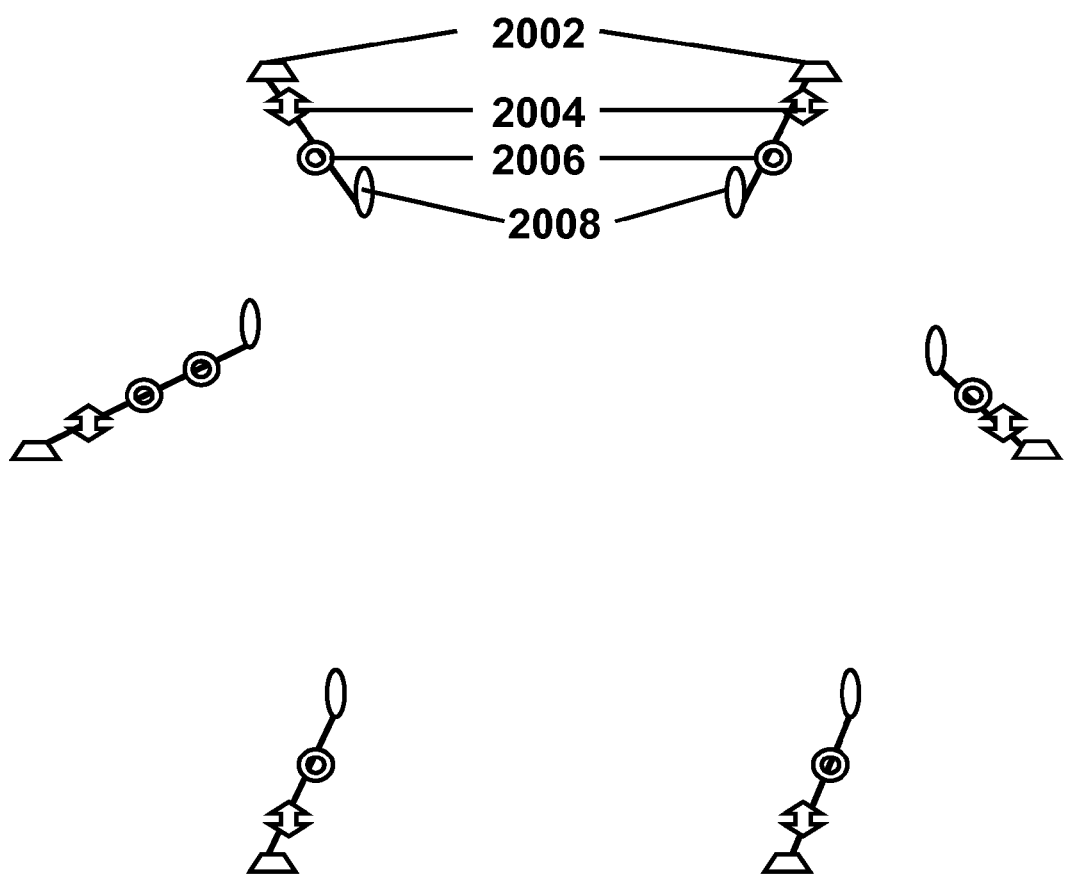
FIGS. 20K to 20N, are schematic top plan views, generally similar to those of FIGS. 10A-10E and 20A to 20J, illustrating a preferred method for deploying floating power generation assemblies of the present invention.
Figure 20L:
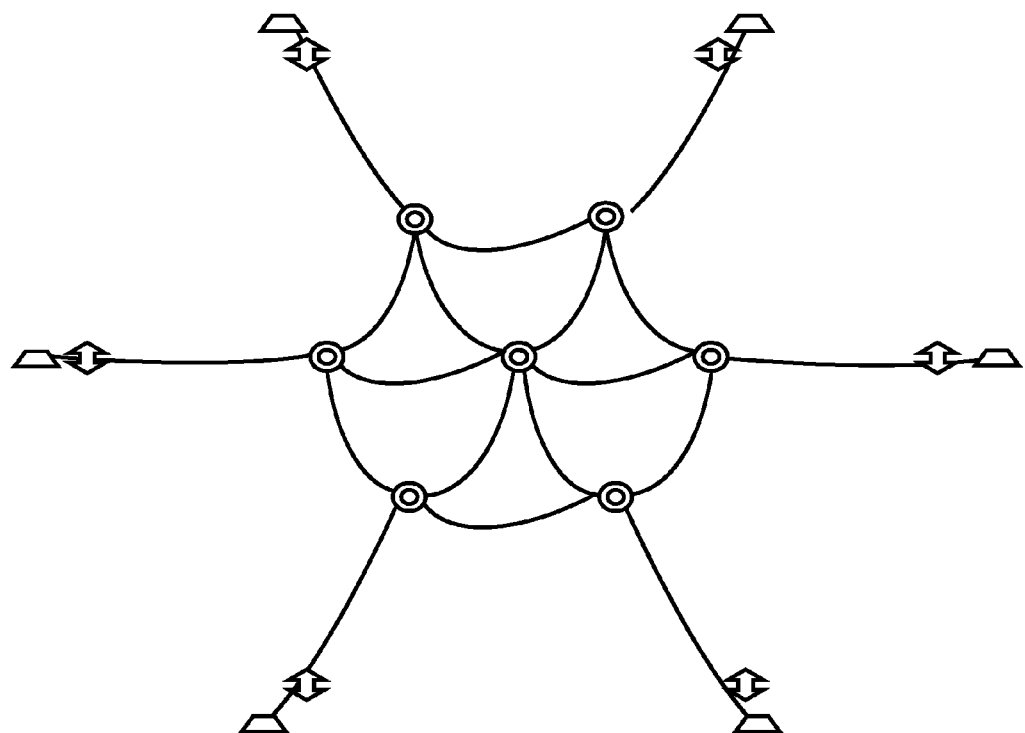

As illustrated in FIG. 20K, the process begins by placing anchors 2002 at the position which they occupy in the final floating power generation assembly. The anchors 2002 are connected by cable portions to cable adjustment devices (typically in the form of winches 2004) which serve to lengthen or shorten their associated cables, temporary connectors 2006 and temporary buoys 2008. (Note that one of the anchors 2002, the left-hand one as illustrated in FIG. 20K, carries two temporary connectors 2006, while the other anchors carry only one each.) In the next step of the process, as illustrated in FIG. 20L, additional cable is paid out from the winches 2004 and the various cables are interconnected so that the temporary connectors 2006 occupy substantially the positions which the floating units 900 will occupy in the final assembly, and the cable network is topologically the same as the final network, though not occupying exactly the same positions. The temporary buoys 2008 are omitted from FIG. 20L for the sake of clarity, but occupy positions closely adjacent their associated temporary connectors 2006 and serve to keep the temporary connectors 2006 and the adjacent portions of the cables close to the water surface.

Figure 20M:
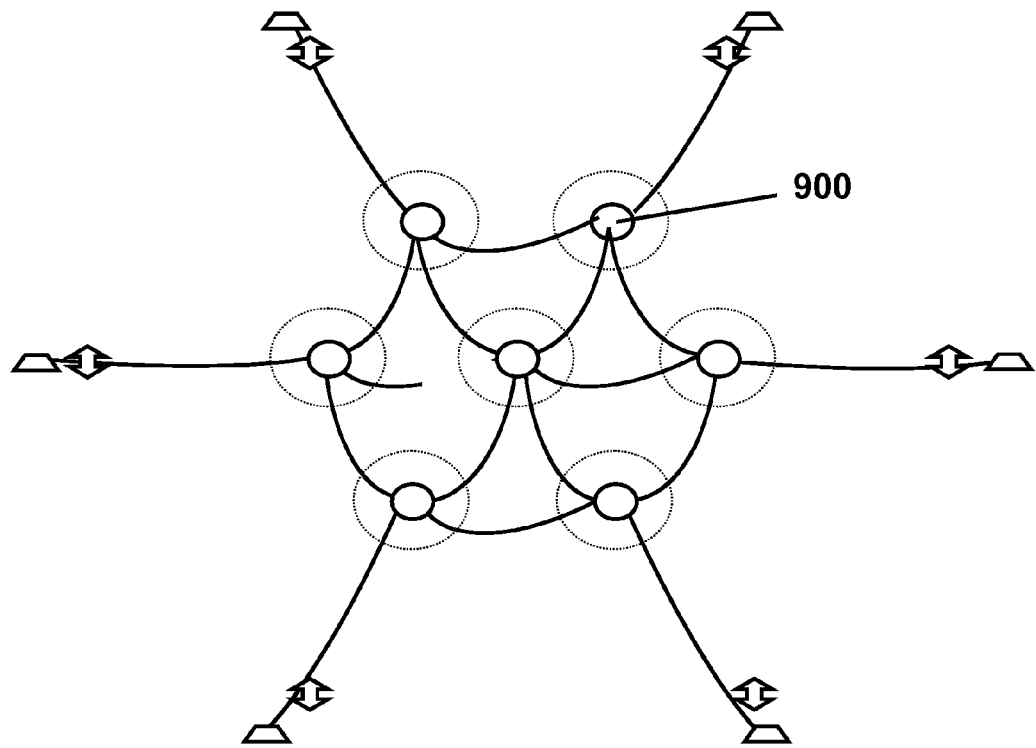
Figure 20N:
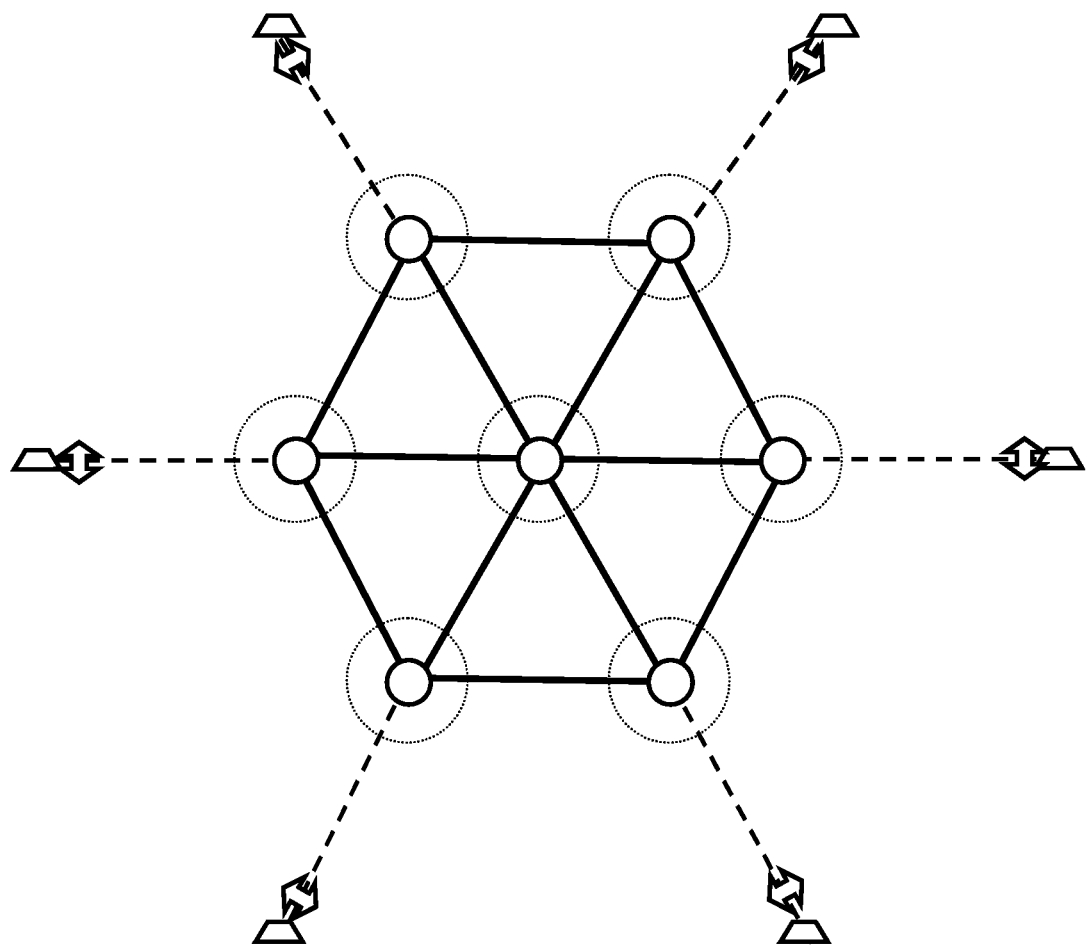

Next, as illustrated in FIG. 20M, the temporary connectors 2006 are replaced by the floating units 900, without substantially changing the geometry of the assembly; the temporary buoys 2008 are also removed at this stage since the buoyancy of the floating units 900 renders the temporary buoys 2008 unnecessary. Finally, as illustrated in FIG. 20N, the winches 2004 are used to shorten the cables so as to provide the necessary tension in the cables and produce the final floating power generation assembly shown in FIG. 20D.

Figure 22B:
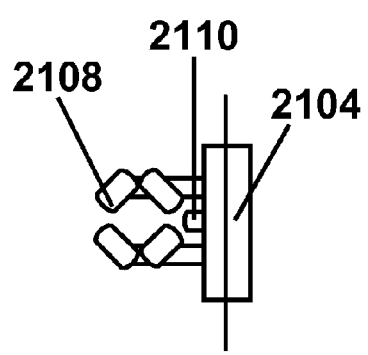
FIG. 22B is a schematic top plan view, similar to that of FIG. 21B, showing the apparatus in the same vertical position as in FIG. 22A with the clamping members in their closed position.
Figure 22C:
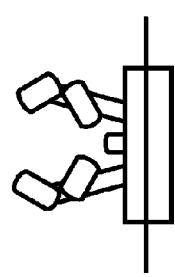
FIG. 22C is a schematic top plan view, similar to that of FIG. 22B, showing the clamping members in their open position.
Figure 23B:
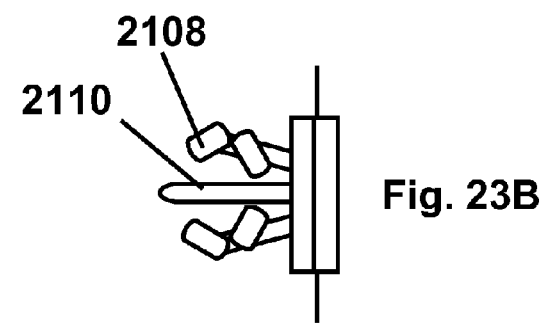
FIG. 23B is a schematic top plan view, similar to that of FIG. 22B, but showing the support beams in the same position as in FIG. 23A.
Figure 23A:
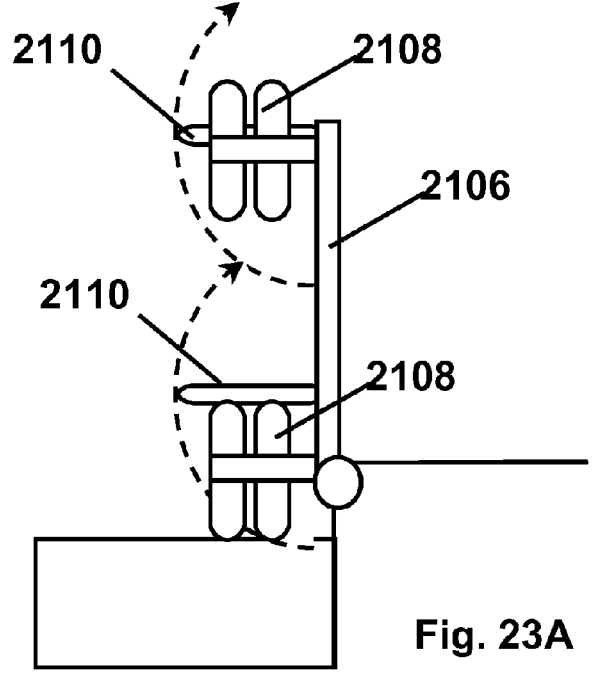
FIG. 23A is a schematic side elevation, similar to that of FIG. 22A, but showing the support beams of the apparatus deployed to support a load.

A preferred deployment process for the floating units 900 will now be described with reference to FIGS. 21 to 23. As shown in FIGS. 21A and 21B, the process uses an apparatus (generally designated 2100) mounted on an open deck 2102 of a vessel (only part of which is shown in FIG. 21A), the apparatus 2100 being pivotable relative to the deck 2102 about a horizontal axis indicated at 2104 adjacent the rear edge of the deck 2102. The apparatus 2100 comprises a base member 2106 having mounted thereof two spaced clamping members 2108, with two support beams 2110. As best seen in FIGS. 22B and 22C, the clamping members 2108 each have two jaws movable relative to each other between a closed position (FIG. 22B) in which they can clamp a unit 900 or 1100, and an open position (FIG. 22C) in which the unit is free to move relative to the clamping members.

As may be seen from FIGS. 21A, 22A, 23A and 23B, the entire apparatus 2100 can be pivoted above axis 2104 between a horizontal position (FIG. 21A) used for transport of a unit, and a vertical position (FIG. 22A) used for loading or deploying a unit. Furthermore, when the clamping members 2108 are in their open position, the support beams 2110 can pivot relative to the base member 2106 between a position in which they lie flat against the base member 2106 (FIG. 22A) to a position in which they extend perpendicular to the base member (FIGS. 23A and 23B) between the open jaws of the clamping members 2108, so that the support beams 2110 can be used to secure and handle the unit 900 or 1100.

Figure 24A:
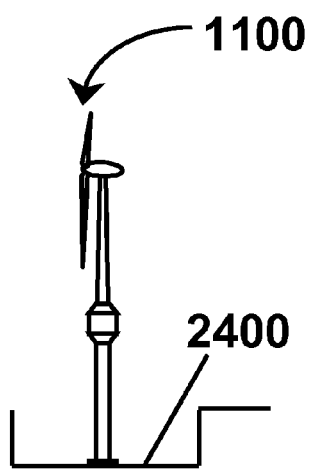
FIGS. 24A to 24D are schematic side elevations showing the manner in which the apparatus shown in FIGS. 21 to 23 is used to load a wind turbine on to a ship for transport to a deployment location.
Figure 24B:
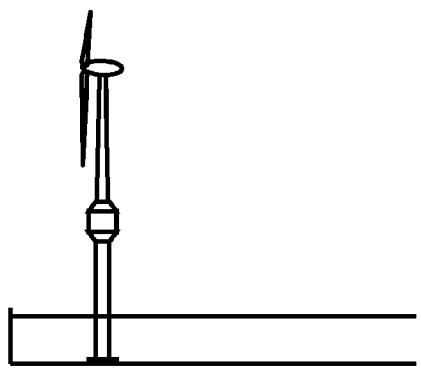
Figure 24C:
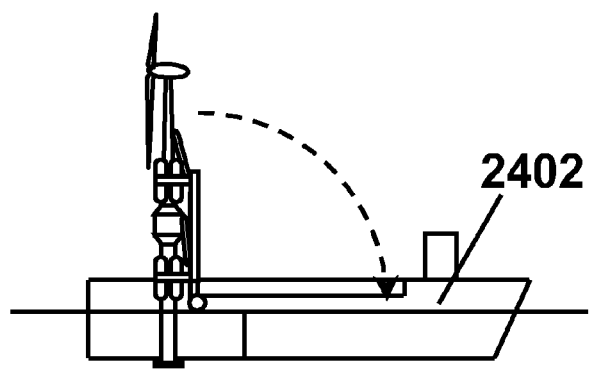
Figure 24D:
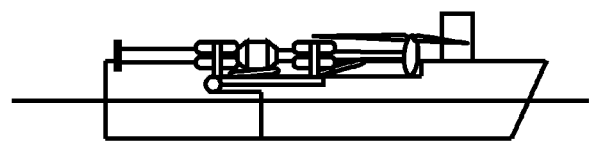
Figure 24E:
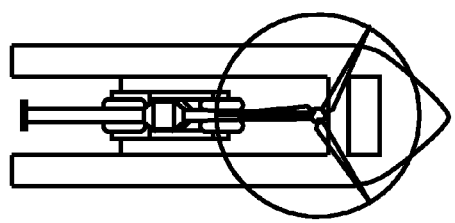
FIG. 24E is a top plan view of the ship and associated apparatus shown in FIG. 24D.

FIGS. 24A to 24E illustrate the manner in which the apparatus 2100 is used to load a unit 1100 on to a vessel for transport to a deployment site. The unit 1100 will normally be constructed in a dry dock 2400 (FIG. 24A). The dry dock is then flooded (FIG. 24B) and the vessel 2402 equipped with the apparatus 2100 is guided into the flooded dock with the apparatus 2100 in its vertical position. The support beams 2110 are attached to, and the clamping members 2108 are clamped around, the unit 1100 (FIG. 24C) and the apparatus 2100 is then lowered to its horizontal position, thereby placing the unit 1100 flat on the deck of the vessel ready for transport to a deployment site (FIG. 24D). FIG. 24E shows a top plan view of the vessel and unit 1100 in this position.

Figure 25A:
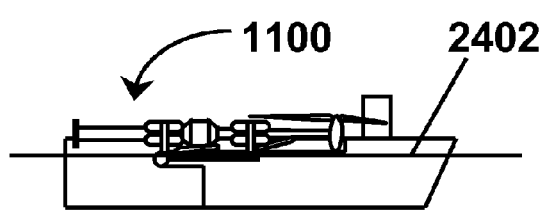
FIGS. 25A to 25D are schematic side elevations, similar to those of FIGS. 24A to 24D, showing the manner in which the apparatus shown in FIGS. 21 to 23 is used to place a wind turbine in a floating position at the site of a floating power generation assembly.
Figure 25C:
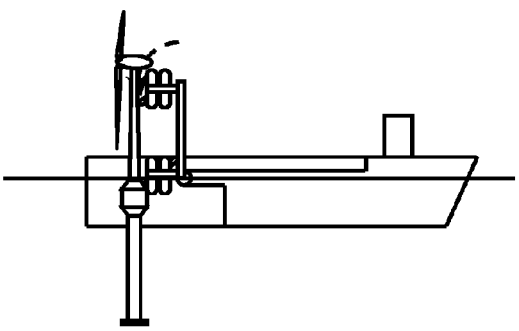
Figure 25B:
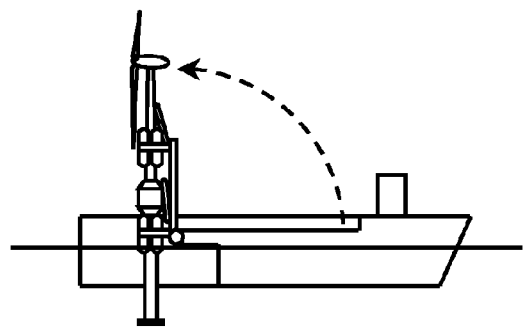
Figure 25D:
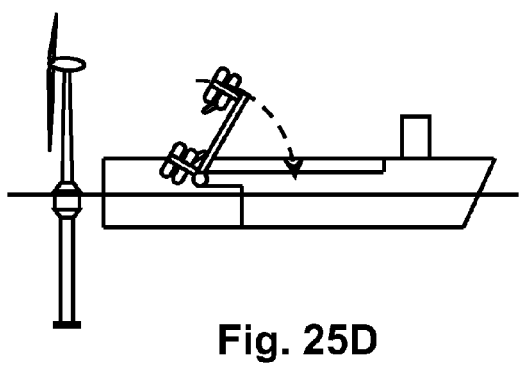

FIGS. 25A to 25D illustrate the deployment of the unit 1100 at the deployment site. FIG. 25A, which is essentially identical to FIG. 24D, shows the vessel and unit arriving on site. The apparatus 2100 and unit 1100 are then raised to a vertical position (FIG. 25B). The ballast tanks within the unit 1100 are then partially filled to adjust the buoyancy of the unit, the support beams 2110 are unlocked and the clamping members 2108 opened, and the ballast tanks further filled to achieve the correct deployment depth for the unit 1100 (FIG. 25C). The unit 1100 is now floating free of the vessel, which is moved away from the floating unit and the apparatus 2100 returned to its horizontal position on the deck (FIG. 25D). Retrieval of the unit 1100 can be achieved by reversing this deployment process.

The deployment process of the present invention has several advantages over conventional deployment processes using marine cranes. During the stage of the deployment process in which the floating unit is moved from a horizontal position on a deck to a floating position, the great weight of the unit is applied to a lifting pivot which is significantly lower than that of the top of a crane capable of effecting the same operation, and this lower pivot position renders the present deployment process more suitable to be carried out in rough and calm seas. The lower pivot position also constrains the effective center of gravity of the unit relative to the vessel during lifting, thus minimizing the reduction in vessel stability and vessel motion experienced during such lifting, as compared with crane-based deployment of such a heavy floating unit. The unit can be lowered to the desired floating position by gradual filling of its ballast tanks, thus continuously maintaining the buoyancy balance of the unit and ensuring a "soft landing". For similar reasons, the retrieval process is also simpler as compared to a process using a crane.

FIGS. 26A, 26B and 26C illustrate a modification of the process shown in 25A to 25D using an external floatation device 2600, which may be used when the unit being deployed is not sufficiently buoyant in its raised (vertical) position. As shown in FIG. 26A, the external floatation device is placed around, and clamped to, the subsurface section of the unit 1100 while the unit is still in its horizontal position on a deck; it may be convenient to place the external floating device on the unit before the unit is loaded on to the vessel. The unit is raised to its vertical position with the device 2600 still attached (FIG. 26B), but when the buoy reaches buoyancy equilibrium after partial filling of its ballast tanks, the clamps holding the device 2600 open and the device floats free of the unit 1100 (FIG. 26C). Although not shown in FIGS. 26A, 26B and 26C, the device 2600 is desirably connected to the vessel by a cable of similar device to enable it to be retrieved from the water once the unit 1100 is floating free.

Figure 27G:
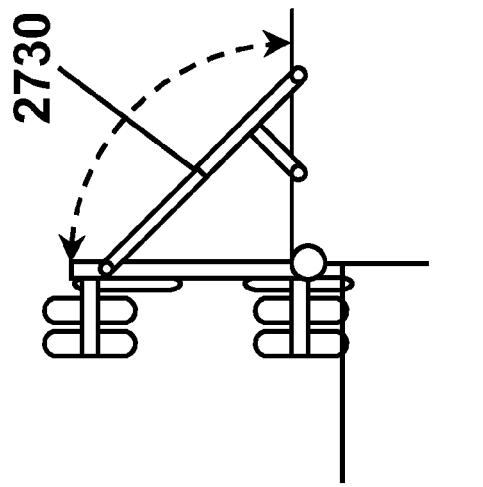
Figure 27F:
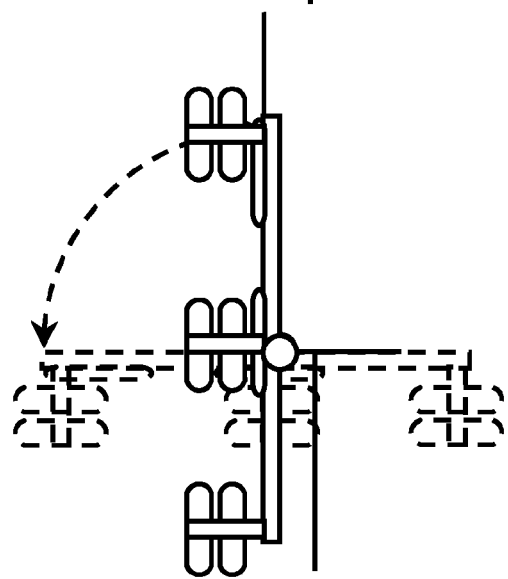
Figure 27E:
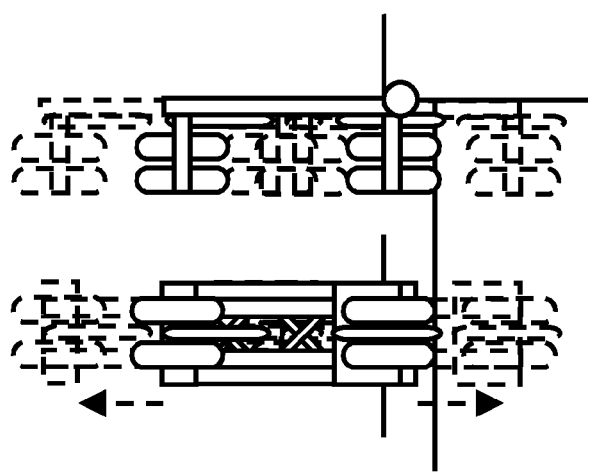

Numerous variations in the form of the apparatus 2100 are possible, and several are illustrated in FIGS. 27A to 27G. FIGS. 27A and 27B illustrate a modified apparatus 2700 in which one clamping member 2708A is movable relative to the base member and to the other clamping member 2708B, thus allowing the spacing between the two clamping members to be varied and the apparatus 2700 to handle floating units of differing lengths. FIGS. 27C and 27D illustrate a modified apparatus 2710 having a pivot 2714 which is adjustable vertically relative to the deck of the vessel, thereby allowing apparatus 2710 to handle floating units having differing buoyancy centers. FIG. 27E shows a further modified apparatus in which the base member can be translated relative to the pivot axis so that the clamping members and the support beams can move vertically during deployment or retrieval of a floating unit. FIG. 27F illustrates a modified apparatus comprising three spaced clamping members, one of which is disposed a substantial distance below the water surface when the apparatus is raised to its vertical position; this submerged clamping member provides additional support for the subsurface section of the floating unit being deployed. Finally, FIG. 27G illustrates a further modified apparatus in which a hydraulic support 2730 is provided between the deck and the base member to provide supplementary lifting force.

In the various floating power generation assemblies shown in FIGS. 10 and 20, the floating units 900 are arranged in equilateral triangles. This is, however, not an essential feature of the power generation assemblies; arranging the floating units in equilateral triangles maximizes the number of floating units per area of water surface, but non-equilateral triangles or other polygons, especially quadrilaterals may be desirable to allow for particular circumstances. In particular, when a floating power generation assembly is in a location where the winds are predominantly from one direction, it has been found advantageous to distort equilateral triangle based arrangements such as those shown in FIGS. 10 and 20 by extending the arrangements along the prevailing wind direction. In theory, the floating units should be arranged so that they do not shade one another ("shading" refers to the tendency of an upwind floating unit to reduce the power output of a downwind floating unit) when the wind is in the prevailing direction. In practice, this is essentially impossible to realize, since even in areas where the winds are unusually constant in direction, for example areas where trade winds blow all year, the "prevailing wind direction" will actually be a range of (say) 45 degrees. Accordingly, in practice it is desirable to arrange the floating units so that the distances between units are larger along directions close to the prevailing wind direction. Examples of assemblies based on distorted equilateral triangles are shown in FIGS. 28A and 28B.

Figure 28A:
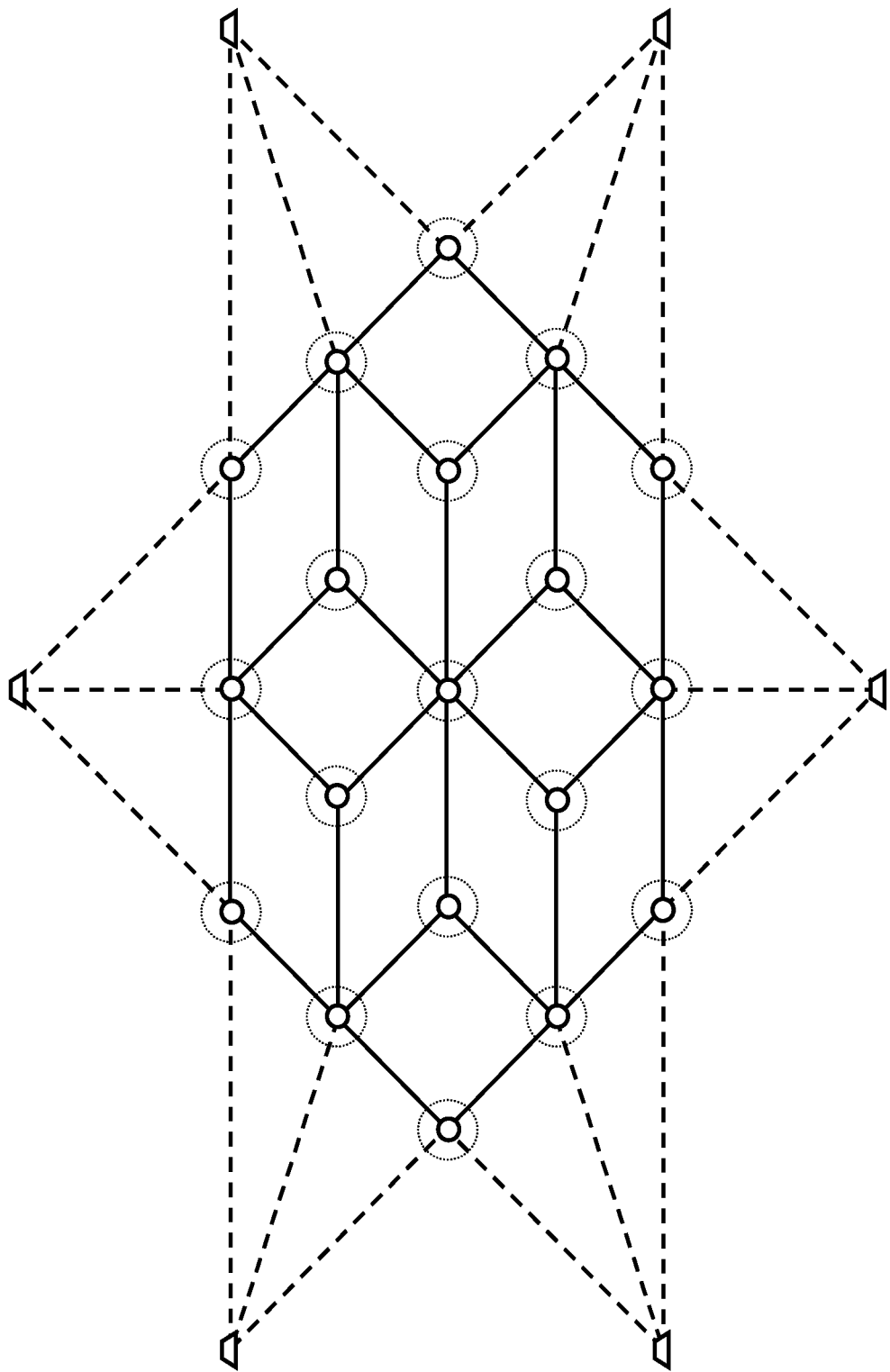
FIGS. 28A and 28B show forms of the floating power generation assemblies of the present invention modified to take advantage of locations where the wind is known to be predominantly in one direction.
Figure 28B:
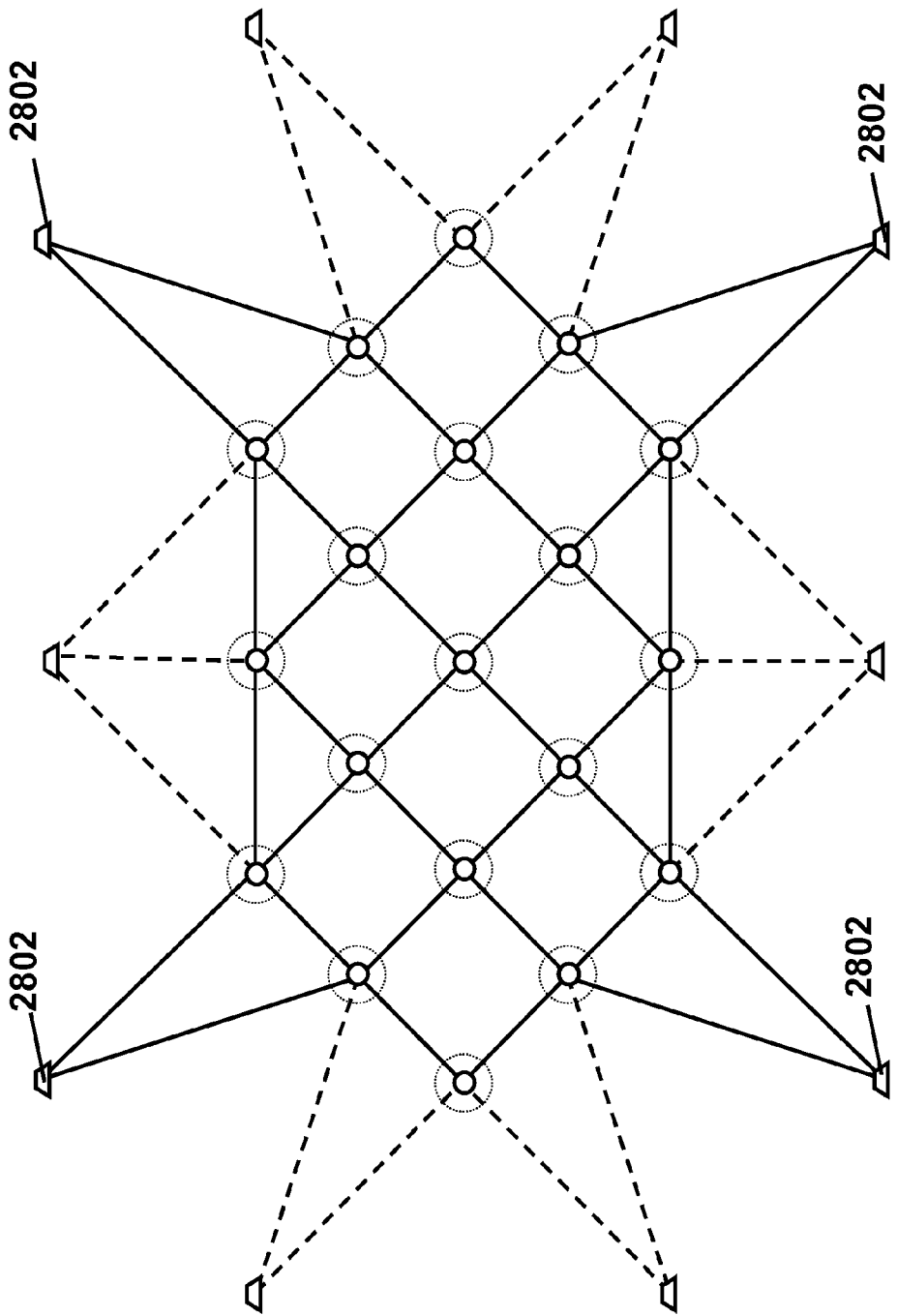

FIG. 28A shows a variant of the 6 anchor, 19 floating unit assembly shown in FIG. 20G modified to allow for a prevailing wind which, for purposes of illustration, is assumed to blow horizontally across the drawing (allowance being made of course for the landscape orientation of the drawing as presented). To allow for the prevailing wind, the assembly is stretched approximately 50 percent along the prevailing wind direction, so that the adjacent floating units are separated by six times the blade diameter in the direction of the prevailing wind but by only four times the blade diameter perpendicular to this direction. This increased spacing between floating units parallel to the prevailing wind direction reduces the "shading" effect of one floating unit on an adjacent downstream floating unit.

Assemblies such as those shown in FIG. 28A, in which the spacing between adjacent floating units is increased along the prevailing wind direction, may have open angles greater than 120 degrees. Such large open angles tend to make the assembly more vulnerable to disruption by weather. Depending upon the expected weather conditions at the location of the assembly, it may be desirable to provide additional anchors to increase assembly stability and to reallocate some cables to eliminate large open angles. For example, FIG. 28B shows a modified form of the assembly of FIG. 28A provided with four additional anchors 2802, and with several cables attached to these anchors 2802 reallocated to remove large open angles.

Figure 29A:
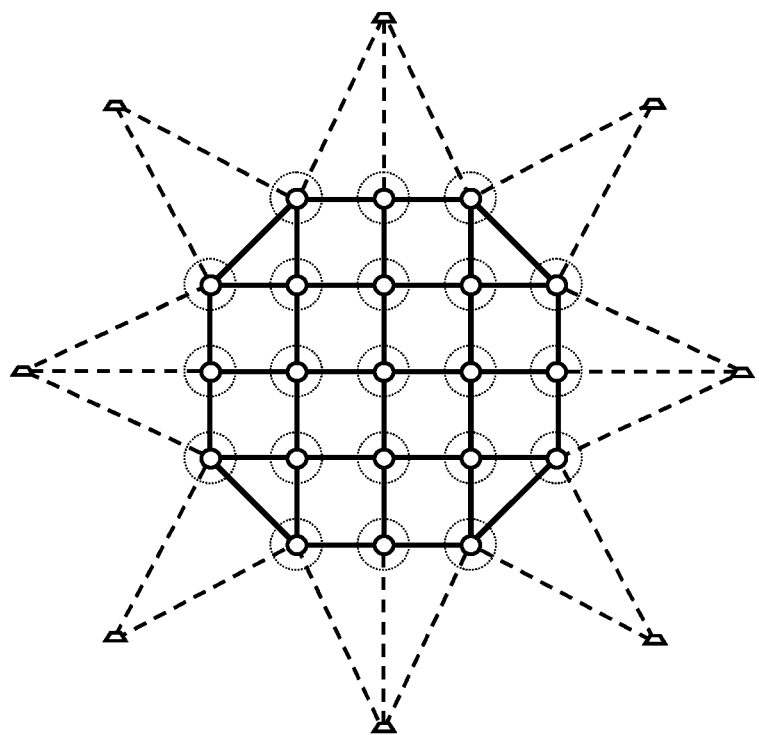
FIGS. 29A to 29C show forms of the floating power generation assemblies of the present invention in which the floating units are arranged in quadrilaterals.
Figure 29B:
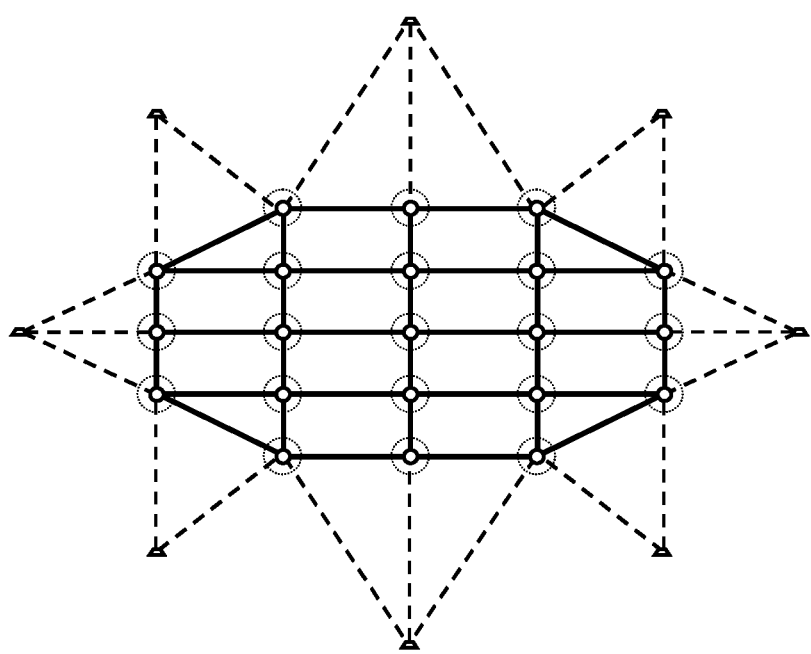
Figure 29C:
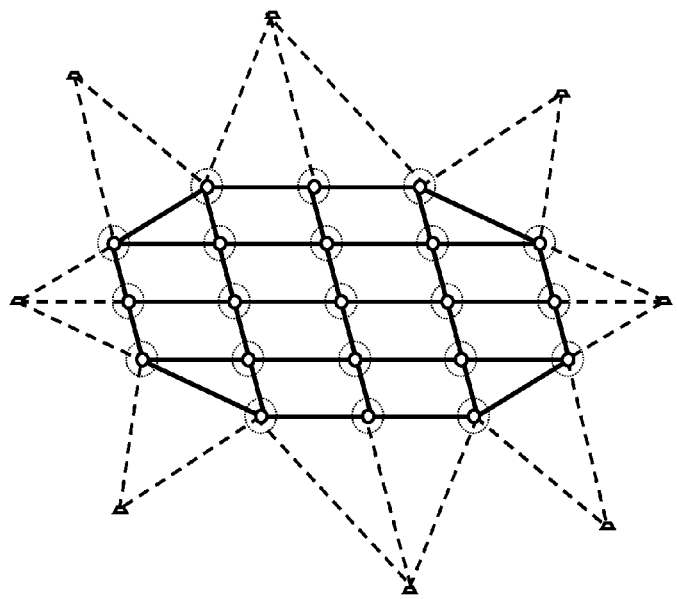

As already mentioned, the floating units used in the floating power generation assemblies of the present invention need not be arranged at the vertices of triangles but may be arranged at the vertices of a quadrilateral, preferably a rectangle or square. FIGS. 29A-29C illustrate assemblies of this type. FIG. 29A illustrates an assembly comprising eight anchors and 21 floating units, the floating units essentially being arranged in a modified 5×5 array with the corner units omitted, so that the floating units are arranged at the vertices of ten squares and four right angled triangles. FIG. 29B illustrates a modified version of the assembly of FIG. 29A which has been distorted in the same manner as the assembly shown in FIG. 28B, i.e., the assembly of FIG. 29B is produced by elongating the assembly of FIG. 29A in the horizontal direction, which is assumed to be the direction of the prevailing wind. The assembly of FIG. 29C is also produced by elongating the assembly of FIG. 29A, but this time in a diagonal direction so that the floating units in FIG. 29C are actually arranged at the vertices of parallelograms rather than squares (as in FIG. 29A) or rectangles (as in FIG. 29B).

Figure 30A:
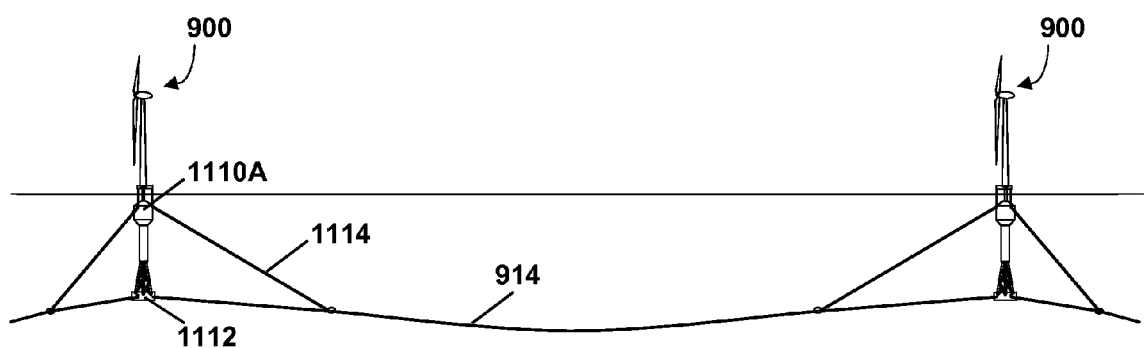
FIGS. 30A to 30C show various cable arrangements which may be used in floating power generation assemblies of the present invention.
Figure 30B:
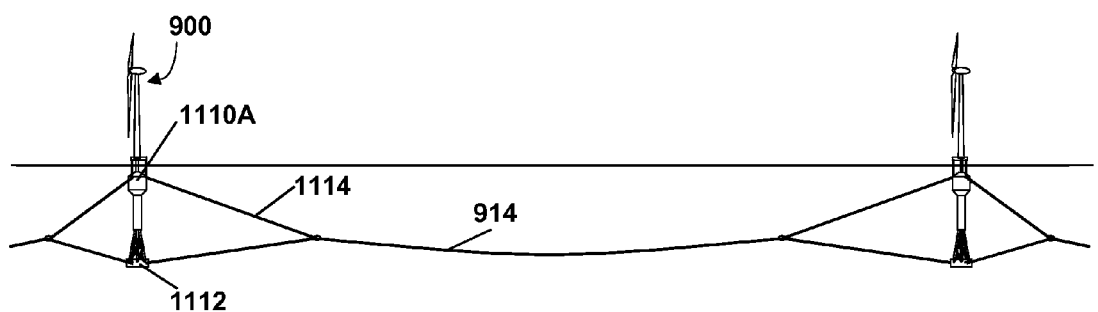
Figure 30C:
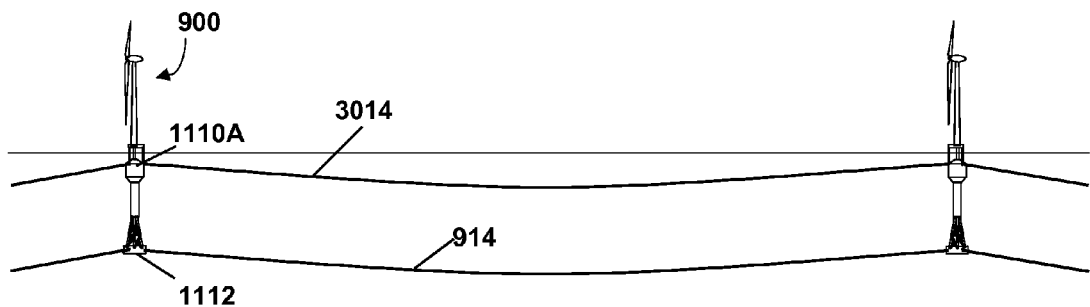

FIGS. 30A to 30C illustrate various possible forms of the auxiliary cables previously discussed with reference to FIG. 11. FIG. 30A shows two interconnected floating units 900 interconnected via a main cable 914 and auxiliary cables 1114. The arrangement of the main cables and auxiliary cables in FIG. 30A is the same as in FIG. 11; the main cable 914 interconnects the base sections 1112 of the two floating units 900, while the auxiliary cables 1114 extend from the main cable 914 to the central cylindrical sections 1110A of the floating units 900.

In the modified assembly shown in FIG. 30B, the arrangement of the main cable 914 and the auxiliary cables 1114 is similar to that shown in FIG. 30A, but the length of the auxiliary cables 1114 has been adjusted such that the auxiliary cables pull the portions of the main cable 914 to which the auxiliary cables 1114 are attached upwardly. Depending upon the length in the auxiliary cables 1114, the points of attachment of the auxiliary cables 1114 to the main cable 914 may be located about halfway between the base sections 1112 and the cylindrical sections 1110A of the floating units 900.

Finally, FIG. 30C illustrates a different type of auxiliary cable, identified as 3014. This type of auxiliary cable 3014 is not connected to the main cable 914 but extends directly between the cylindrical sections 1110A of two adjacent floating units 900, running essentially parallel to but above the main cable 914. This type of auxiliary cable 3014 may provide reduced wave induced motions of the units (900) by setting the lengths of cables 914 and 3014 appropriate to the primary wave characteristics for which to minimize motions. This also provides a more robust connection between the floating units 900 but does have the disadvantage that if the floating assembly is in an area through which vessels may need to pass, the auxiliary cable 3014 allows only a limited draft for such vessels.

Figure 31A:
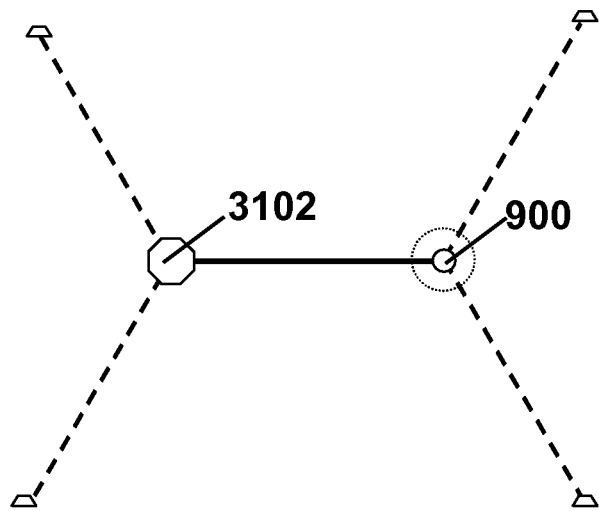
FIGS. 31A and 31B show floating power generation assemblies of the present invention which use power generating floating units in association with non-power generating floating units.
Figure 31B:
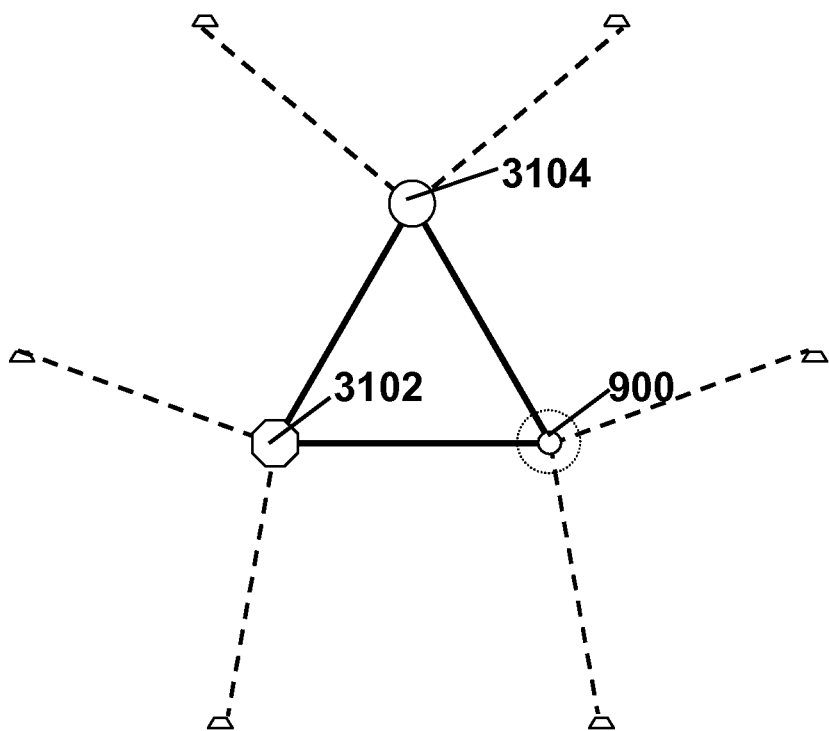

FIGS. 31A and 31B illustrate floating assemblies of the present invention which combine power generating and non-generating floating units and are intended primarily for research and surveillance purposes. The assembly shown in FIG. 31A comprises four anchors, a power generating floating unit 900 and a helicopter deck unit 3102. The assembly shown in FIG. 31B comprises six anchors, a power generating floating unit 900, a helicopter deck unit 3102, and a radar unit 3104, with the three units 900, 3102 and 3104 being arranged in an equilateral triangle and each connected to two anchors.

Figure 32:
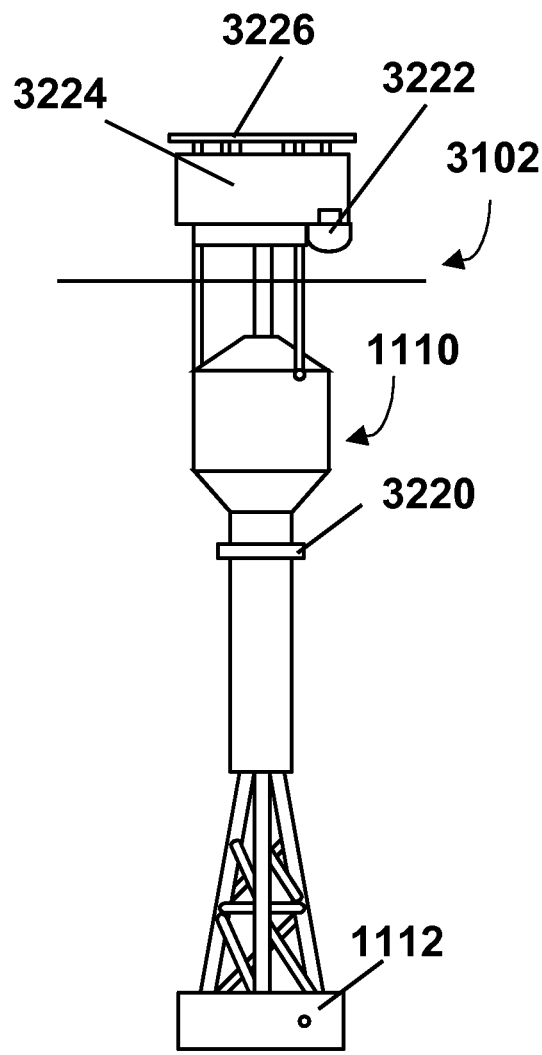
FIGS. 32 and 33 show two types of non-power generating floating units used in the assemblies of FIGS. 31A and 31B.
Figure 33:
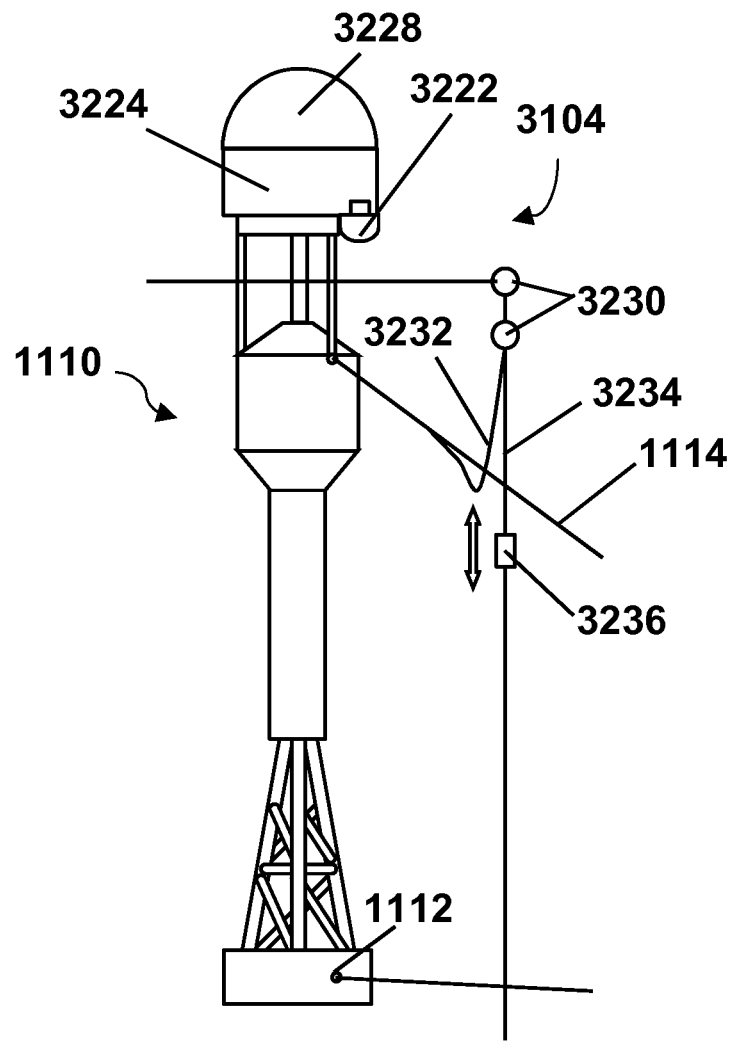

FIGS. 32 and 33 are enlarged side elevations of the units 3102 and 3104 respectively shown in FIGS. 31A and 31B. The submerged part of each of the units 3102 and 3104 closely resembles that of the floating unit 1100 shown in FIG. 11 and is labeled accordingly. The submerged part of the helicopter deck unit 3102 is provided with a submersible docking station 3220. Above the water line, both units 3102 and 3104 are provided with a small vessel dock 3222 and with laboratory or work space 3224. The flat upper surface of unit 3102 forms a helicopter deck 3226.

The upper part of unit 3104 comprises a radar or communications dome 3228. In addition, unit 3104 is provided with a sensor unit which comprises floats 3230 tethered by a cable 3232 to an auxiliary cable 1114, as described above with reference to FIG. 11. A rod or cable 3234 hangs down from the floats 3230 and carries one or more sensor units 3236 (only one such unit is shown in FIG. 33); these sensor units 3236 may measure wave motion (as indicated by the double arrow in FIG. 33), water temperature and salinity, currents and any other desired parameters. Additional sensors or sensor units may be provided on the main and auxiliary cables if desired, and all sensors can feed back to instruments in the laboratory space 3224.

It will be appreciated that the provision of the various auxiliary structures such as the submersible docking station, vessel dock and sensor units on the units 3102 and 3104 is highly variable and that any of the auxiliary structures can be provided on either unit. Indeed, by enlarging the deck 3226, it might be possible to provide both a helicopter deck and a radar or communications dome, thus essentially combining the functions of the units 3102 and 3104.

It will readily be apparent to those skilled in the art that numerous changes and modifications can be made to the preferred embodiments of the invention described above without departing from the scope of the invention. In particular, the type of floating units described herein are highly scaleable without substantial modification of the design, and accordingly the preferred dimensions, weights and power outputs mentioned above can vary widely depending upon the particular power output desired. Therefore, it is intended that the embodiments described herein be considered as illustrative and not be construed in a limiting sense.

The invention claimed is:

1. A process for assembling a floating power generation assembly having as components at least three floating units floating on a body of water, and at least three anchors secured to a solid surface beneath the body of water, each of the floating units being provided with power generation means, each of the anchors being connected by cables to at least two of the floating units, and each of the floating units being connected by cables to at least two other components, the process comprising:

placing the anchors in the desired positions, with each anchor having attached thereto a cable, means for varying the length of the cable, at least one temporary connector capable of interconnecting at least two cables, and floatation means capable of keeping the end of the cable remote from the anchor at the water surface;

interconnecting the cables by means of the temporary connectors to provide the connections between cables required in the final assembly;

replacing the temporary connectors with the floating units; and reducing the length of at least one cable to produce the final assembly.

2. A process according to claim 1 wherein each power generation means comprises at least one of a wind turbine and a means for extracting power from waves and/or currents.

3. A process according to claim 1 wherein each of the floating units is connected by cables to at least three other components of the assembly.

4. A process according to claim 1 wherein at least one of the floating units comprises:

a mast extending from above to below the water surface;

a wind turbine comprising a plurality of blades and rotatably mounted at or adjacent the upper end of the mast such that the blades do not contact the water as they rotate;

a buoyancy section provided on the mast adjacent the water surface and arranged to provide buoyancy to the assembly; and a base section provided on the mast below the water surface and having the cables attached thereto, the base section being weighted such that the center of gravity of the floating unit is substantially below the water surface.

5. A process according to claim 4 wherein the center of gravity of the floating unit is at least about 30 meters below the water surface.

6. A process according to claim 4 wherein at least two auxiliary cables extend from the buoyancy section to the cables connecting the base section to other components of the assembly, or to other components of the assembly.

7. A process according to claim 4 wherein the base section is provided with a peripheral hoop arranged to increase the hydrodynamic mass of the floating unit and to lengthen the natural heave period thereof.

* * * * *